(12) United States Patent
Klappert et al.

(10) Patent No.: US 10,812,851 B2
(45) Date of Patent: *Oct. 20, 2020

(54) METHODS AND SYSTEMS FOR PRESENTING MEDIA LISTINGS BASED ON QUALITY OF SERVICE AT A USER DEVICE

(71) Applicant: Rovi Guides, Inc., San Carlos, CA (US)

(72) Inventors: Walter R. Klappert, Los Angeles, CA (US); Raymond Valadez, Jr., Walnut, CA (US)

(73) Assignee: Rovi Guides, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/155,485

(22) Filed: May 16, 2016

(65) Prior Publication Data

US 2017/0332123 A1    Nov. 16, 2017

(51) Int. Cl.
| | |
|---|---|
| H04N 21/262 | (2011.01) |
| H04N 21/482 | (2011.01) |
| H04N 21/24 | (2011.01) |
| H04N 21/442 | (2011.01) |
| H04N 21/2362 | (2011.01) |
| H04N 21/475 | (2011.01) |
| H04N 21/258 | (2011.01) |
| H04N 21/462 | (2011.01) |

(52) U.S. Cl.
CPC ... *H04N 21/26283* (2013.01); *H04N 21/2362* (2013.01); *H04N 21/2402* (2013.01); *H04N 21/25866* (2013.01); *H04N 21/44209* (2013.01); *H04N 21/4622* (2013.01); *H04N 21/4756* (2013.01); *H04N 21/4821* (2013.01)

(58) Field of Classification Search
CPC ........ H04N 21/26283; H04N 21/2362; H04N 21/2402; H04N 21/44209; H04N 21/4756; H04N 21/435; H04N 21/4821
USPC .................................. 725/40; 709/213, 217
See application file for complete search history.

(56) References Cited

U.S. PATENT DOCUMENTS

| | | |
|---|---|---|
| 6,711,743 B1 | 3/2004 | Hong et al. |
| 8,826,347 B1 | 9/2014 | Earle |
| 9,204,421 B2 | 12/2015 | Harris et al. |
| 9,215,268 B1 | 12/2015 | Wood et al. |
| 9,251,534 B2 | 2/2016 | Hooley |
| 9,491,504 B1 | 11/2016 | Nijim et al. |
| 2002/0065922 A1 | 5/2002 | Shastri |
| 2002/0072333 A1 | 6/2002 | Gnesda et al. |
| 2005/0013391 A1* | 1/2005 | Boer ............... H04L 1/208 375/340 |
| 2006/0107294 A1 | 5/2006 | Rivlin et al. |

(Continued)

FOREIGN PATENT DOCUMENTS

CN    101262492    9/2008

OTHER PUBLICATIONS

Hai Anh Tran et al., "QoE-Based Server Selection for Content Distribution Networks," IEEE Transactions on Computers, vol. 63, pp. 2603-2815 (2014).

(Continued)

*Primary Examiner* — Joshua D Taylor
(74) *Attorney, Agent, or Firm* — Haley Guillano LLP

(57) ABSTRACT

Methods and systems are described for presenting media listings based on quality of service at a user device.

16 Claims, 11 Drawing Sheets

(56) References Cited

U.S. PATENT DOCUMENTS

| | | | |
|---|---|---|---|
| 2006/0206581 A1* | 9/2006 | Howarth | H04N 7/17318 709/217 |
| 2007/0174891 A1 | 7/2007 | Gouhara | |
| 2008/0028424 A1 | 1/2008 | Cho | |
| 2008/0074497 A1 | 3/2008 | Kuh | |
| 2008/0141317 A1 | 6/2008 | Radloff et al. | |
| 2009/0106699 A1 | 4/2009 | Kihara et al. | |
| 2009/0282447 A1* | 11/2009 | Mehta | H04L 65/4076 725/109 |
| 2010/0130177 A1* | 5/2010 | Ku | H04M 15/00 455/414.1 |
| 2010/0231805 A1* | 9/2010 | Quere | H04N 7/173 348/725 |
| 2011/0213879 A1 | 9/2011 | King et al. | |
| 2011/0299550 A1* | 12/2011 | Karaoguz | G06Q 20/10 370/401 |
| 2012/0137377 A1 | 5/2012 | Green et al. | |
| 2014/0006538 A1* | 1/2014 | Oikonomou | H04L 67/2847 709/213 |
| 2014/0032644 A1 | 1/2014 | Saxena et al. | |
| 2014/0130092 A1* | 5/2014 | Kunisetty | H04N 21/4821 725/40 |
| 2014/0187238 A1* | 7/2014 | Tsuda | H04W 24/10 455/425 |
| 2014/0282656 A1 | 8/2014 | Belyaev et al. | |
| 2014/0298392 A1* | 10/2014 | Kurihara | H04N 21/2343 725/109 |
| 2015/0040172 A1 | 2/2015 | Zelesko et al. | |
| 2015/0149589 A1 | 5/2015 | Hao et al. | |
| 2016/0050589 A1 | 2/2016 | Safavi | |
| 2016/0150063 A1 | 5/2016 | Choi et al. | |
| 2016/0219024 A1 | 7/2016 | Verzun | |
| 2017/0041669 A1* | 2/2017 | Duval | H04N 21/435 |
| 2017/0178693 A1 | 6/2017 | Austin | |
| 2017/0332124 A1 | 11/2017 | Klappert | |
| 2017/0332146 A1 | 11/2017 | Klappert | |

OTHER PUBLICATIONS

U.S. Appl. No. 15/155,604, filed May 16, 2016, Walter R. Klappert.

* cited by examiner

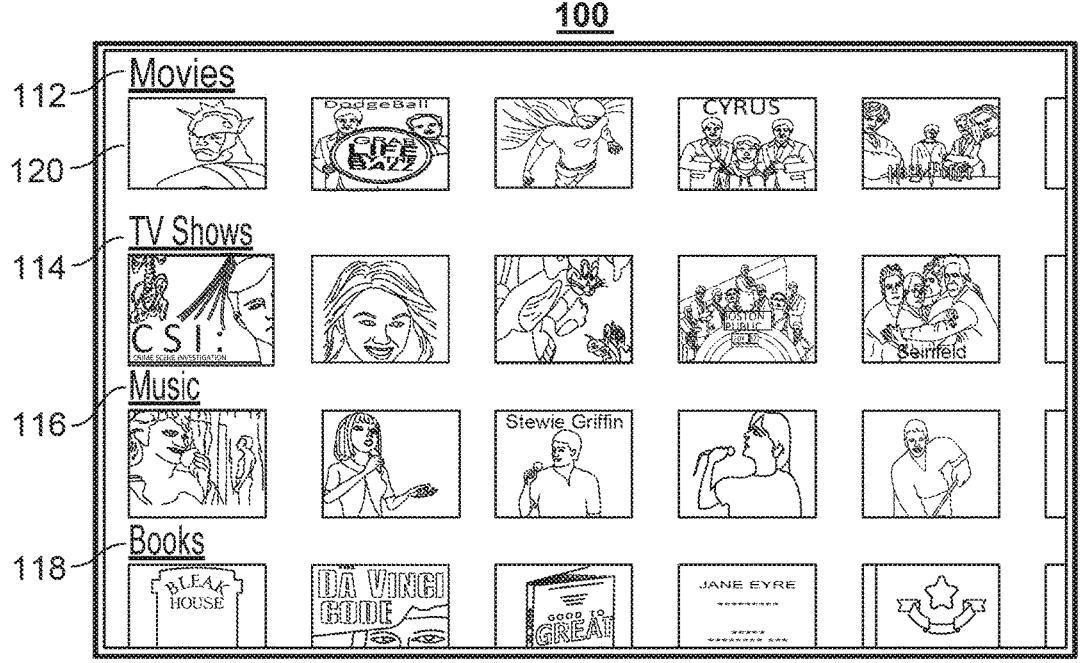
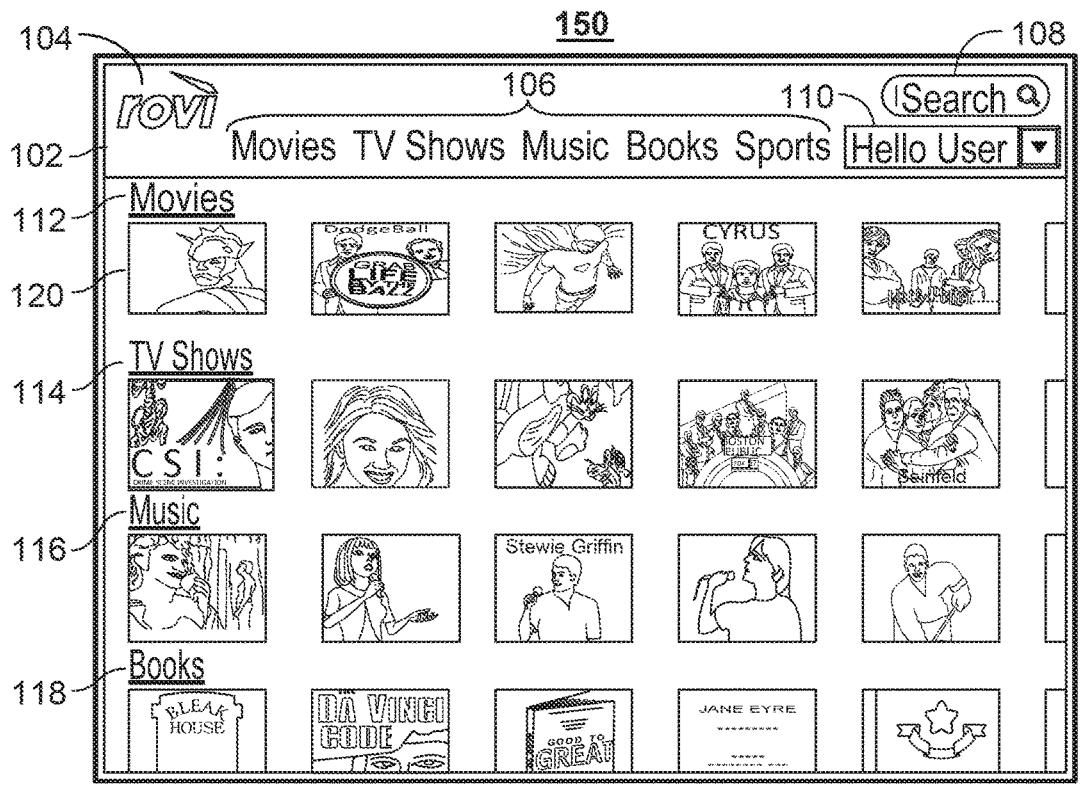
FIG. 1

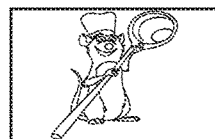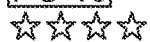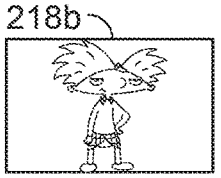
FIG. 2

1100

1100 ...
1101 Initialization Subroutine
1102 ...
1103 //Routine to compare quality of service of content provider to threshold:
1104
1105   Receive instances of quality of service;
1106   For each instance of quality of service:
1107     A = Accessed value of the instance of quality of service
1108     B = Accessed value of stored threshold quality of service
1109         If (Abs(A-B)<=tolerance)
1110             Execute Subroutine to generate media listing from content provider using control circuitry
1111         Else If (A<B)
1112             Execute Subroutine for alternative action using control circuitry
1113         Else
1114             Execute Subroutine to generate media listing from content provider using control circuitry
1115   Execute Subroutine to account for all thresholds
1116 ...
1117 Termination Subroutine
1118 ...

```
1300 ...
1301 Initialization Subroutine
1302 ...
1303 //Routine to search a database for content providers that provide the media asset:
1304
1305 Receive instances of media asset
1306 For each instance of media asset:
1307     Query database containing content providers of media assets for entries
        matching media asset
1308         If (Number of matching entries > 0)
1309             Retrieve value of content providers from database entries matching
        media asset
1310                 Execute Subroutine to determine quality of service using control
        circuitry
1311         Else If (Number of similar entries > 0)
1312             Execute Subroutine to determine quality of service using control
        circuitry
1313         Else
1314             Execute Subroutine to determine quality of service using control
        circuitry
1315 Execute Subroutine to compare quality of services of content providers using
        control circuitry
1316 ...
1317 Termination Subroutine
1318 ...
```

FIG. 13

METHODS AND SYSTEMS FOR PRESENTING MEDIA LISTINGS BASED ON QUALITY OF SERVICE AT A USER DEVICE

BACKGROUND

In conventional systems, users have access to a plethora of media content from a plurality of content providers. Unfortunately, to access this media content from a plurality of content providers, users often must individually subscribe to and manage accounts with the various content providers. Moreover, even after subscribing to each of the content providers, users must individually search the media content libraries of each content provider to find content to consume.

SUMMARY

Accordingly, methods and systems are described herein for a media guidance application that solves the aforementioned problems by aggregating media content for users. Specifically, the media guidance application may automatically subscribe to, and/or manage accounts with, the various content providers for a user. Moreover, users may search the media content libraries of each content provider to find content to consume simultaneously.

For example, the media guidance application may aggregate content from numerous providers and provide the content through a single interface. The single interface may further facilitate coordination between various content providers by allowing users to simultaneously search through the media content libraries of each content provider and receive media recommendations. Furthermore, in order to provide the best possible user experience, the media guidance application may filter and/or select which media listings to present to a user based on the quality of service associated with a content provider for any given media asset.

In some aspects, the media guidance application may select providers of media content. For example, the media guidance application may receive, at a server, a request from a user device, over a communications network, to access media assets from a cloud-based aggregator, wherein the media assets are available from a plurality of over-the-top content providers. For example, a user may remotely access a media guidance application that aggregates content from multiple sources on a mobile device.

The media guidance application may determine, at the server, a first content provider of the plurality of over-the-top content providers that provides a media asset. For example, the media guidance application may determine the media assets currently available from a website that allows users to stream media content. The media guidance application may then determine, at the server, a second content provider of the plurality of over-the-top content providers that provides the media asset. For example, the media guidance application may determine the media assets currently available from a second website that also allows users to stream media content. Moreover, the media guidance application may determine that the two websites both offer the same media asset.

The media guidance application may determine, at the server, a first quality of service for the user device to receive the media asset from the first content provider. For example, the media guidance application may query the user device for a checksum value and receive the checksum value from the user device in response to the query. For example, the media guidance application may determine the error rate for receiving content from the first website. The media guidance application may determine, at the server, a second quality of service for the user device to receive the media asset from the second content provider. For example, the media guidance application may determine the error rate for receiving content from the first website.

The media guidance application may then compare, at the server, the first quality of service to the second quality of service. For example, the media guidance application may determine which website will allow the user to obtain the same media asset with a lower error rate.

The media guidance application may determine, at the server, that the first quality of service is greater than the second quality of service based on the comparison. For example, the media guidance application may compare the error rate corresponding to the first website to the error rate corresponding to the second website.

The media guidance application may generate for display, at the server, a media listing for the media asset from the first content provider based on determining that the first quality of service is greater than the second quality of service. For example, instead of presenting duplicate media listings (e.g., two listings corresponding to the same media asset in which each media listing corresponds to a different media content provider), the media guidance application may automatically (e.g., without requiring any testing and/or further user inputs) select the media listing that provides the user with the best user experience (e.g., provides the best quality of service).

In some embodiments, the quality of service may be based on one or more quality of service characteristics such as an error rate, bit rate, throughput lag, transmission delay, availability, or jitter experienced by the user device. Moreover, in some embodiments, the media guidance application may determine a first quality of service characteristic and a second quality of service characteristic. For example, the media guidance application may determine quality of service based on multiple factors. The media guidance application may assign a first weight to the first quality of service characteristic and a second weight to the second quality of service characteristic. For example, the media guidance application may weigh the factors according to the amount at which the factors affect the user experience, industry standards, and/or user preferences. The media guidance application may then determine a weighted average for the first quality of service characteristic and the second quality of service characteristic. For example, after quantifying the first and second characteristics and applying the respective weights, the media guidance application may determine a sum of the weighted first and second characteristics to determine the quality of service.

In some embodiments, the media guidance application may rate the various quality of services. For example, the media guidance application may input the first quality of service into a database listing ratings corresponding to different quality of services. The media guidance application may compare the first quality of service to the different quality of services to determine a rating for the first quality of service. The media guidance application may then generate for display the rating simultaneously with the media listing. For example, in addition, or as an alternative to, presenting a media listing available from only the content provider that has the best quality of service, the media guidance application may present a quality of service rating along with each media listing. Additionally or alternatively, the media guidance application may generate a notification for accessing the media asset from the second content provider, wherein the notification indicates that the second quality of service is lower than the first quality of service. For example, the media guidance application may present a notification to a user indicating additional sources of a media asset and the respective quality of service (or quality of service rating) corresponding to the other sources.

In some embodiments, in response to determining that the first quality of service is equal to the second quality of service based on the comparison, the media guidance application may generate for display the media listing for the media asset from the first content provider and a different media listing for the media asset from the second content provider. For example, the media guidance application may present media listings from a plurality of sources.

In some embodiments, the media guidance application may determine the available media content providers to aggregate based on a user's subscription status. For example, the media guidance application may retrieve a user profile associated with the user device such as a mobile phone. The media guidance application may retrieve subscription data for the user profile, wherein the subscription data indicates a user subscribes to each of the plurality of over-the-top content providers. For example, the user profile may include a list of each media content provider that the user currently subscribes to and/or whether or not a user is currently subscribing to various media content providers. The media guidance application searches each of the plurality of over-the-top content providers to determine whether each of the plurality of over-the-top content providers provides the media asset based on the subscription data. For example, in response to determining that a user subscribes to (e.g., is allowed accessed to) media assets from a content providers. The media guidance application searches the media content provider for available media assets.

In some embodiments, the media guidance application may apply special thresholds to determine whether or not to present a media listing. For example, the media guidance application may retrieve a threshold quality of service, for example, a minimum acceptable quality of service for which a media listing will be presented. The media guidance application may compare the first quality of service to the threshold quality of service, and, in response to determining that the first quality of service does not equal or exceed the threshold quality of service, the media guidance application may generate for display an option to receive an alert when the first quality of service equals or exceeds the threshold quality of service. Alternatively, in response to determining that the first quality of service does not equal or exceed the threshold quality of service, the media guidance application may generate for display an option to automatically download the first media asset to the server when the first quality of service equals or exceeds the threshold quality of service, wherein the downloaded first media asset is available for on-demand playback on the user device.

In some aspects, the media guidance application may arrange over-the-top content in user interfaces. For example, the media guidance application may receive, at a server, a request from a user device, over a communications network, to access media assets from a cloud-based aggregator, wherein the media assets are available from a plurality of over-the-top content providers. For example, the media guidance application may receive a request from a mobile device requesting access to a library of media assets from numerous streaming media providers over the Internet.

The media guidance application may determine, at the server, a first content provider of the plurality of over-the-top content providers that provides a media asset. For example, the media guidance application may retrieve a user profile associated with the user device and retrieve subscription data for the user profile, wherein the subscription data indicates a user subscribes to each of the plurality of over-the-top content providers. The media guidance application may then search each of the plurality of over-the-top content providers to determine whether each of the plurality of over-the-top content providers provides the media asset based on the subscription data.

The media guidance application may also determine, at the server, a second content provider of the plurality of over-the-top content providers that provides the media asset. For example, the media guidance application may determine that a first streaming media provider (e.g., associated with a broadcast television network) and a second streaming media provider (e.g., associated with a website of user uploaded content) both offer access to the same media asset.

The media guidance application may determine, at the server, a first quality of service for the user device to receive the media asset from the first content provider. For example, based on current network conditions, the media guidance application may determine a bit rate at which the user device may access the media asset from the first content provider. For example, the media guidance application may query a user device for a checksum value and receive the checksum value from the user device in response to the query.

The media guidance application may determine, at the server, a second quality of service for the user device to receive the media asset from the second content provider. For example, based on current network conditions, the media guidance application may determine a bit rate at which the user device may access the media asset from the second content provider as well.

The media guidance application may rank, at the server, the first content provider higher than the second content provider in a ranked list based on the first quality of service being greater than the second quality of service. For example, in order to provide the best user experience (e.g., ensure that the user selects to receive a media asset from a content provider providing the best bit rate), the media guidance application may rank the content providers based on their respective quality of service.

The media guidance application may generate for display, in a user interface, a first media listing for the media asset from the first content provider and a second media listing for the media asset from the second content provider, wherein the first media listing and the second media listing are arranged in the user interface according to a ranking of their respective content provider in the ranked list. For example, while the media guidance application may present a media listing corresponding to the media asset from both content providers, the media guidance application may arrange the listings in an order that reflects their respective quality of services. Accordingly, a user may determine in an intuitive way, which content provider will provide the media asset with the best quality of service.

In some embodiments, the first quality of service is based on one or more quality of service characteristics, and the quality of service characteristics include an error rate, bit rate, throughput lag, transmission delay, availability, or jitter experienced by the user device. Moreover, the media guidance application may determine the first quality of service comprises determining a first quality of service characteristic and a second quality of service characteristic (e.g., error rate and bit rate), assign a first weight to the first quality of service characteristic and a second weight to the second quality of service characteristic (e.g., based on user preferences), and determine a weighted average for the first quality of service characteristic and the second quality of service characteristic (e.g., a weighted average that represents the overall quality of service based on the characteristics).

In some embodiments, the media guidance application may determine qualitative or quantitative quality of service ratings for each content provider. For example, the media guidance application may input the first quality of service into a database listing ratings corresponding to different quality of services. The media guidance application may then compare the first quality of service to the different quality of services to determine a rating for the first quality of service, and generating for display the rating simultaneously with the media listing.

In some embodiments, the media guidance application may graphically accentuate one media listing over another based on a quality of service associated with a content provider providing that media asset. For example, the media guidance application may present the media listings in a mosaic display, wherein the first media listing corresponds to a first mosaic cell and the second media listing corresponds to a second mosaic cell and the first mosaic cell is more prominently displayed than the second mosaic cell.

In some embodiments, the media guidance application may test for and determine whether or not certain criteria meet threshold criteria. If so, specific actions may be triggered. For example, the media guidance application may retrieve a threshold quality of service (e.g., corresponding to a first content provider), and compare the first quality of service to the threshold quality of service. In response to determining that the first quality of service equals or exceeds the threshold quality of service, the media guidance application may add the first media listing to the ranked list. Alternatively or additionally, the media guidance application, in response to determining that the first quality of service does not equal or exceed the threshold quality of service, may generate for display an option to receive an alert when the first quality of service equals or exceeds the threshold quality of service. Alternatively or additionally, in response to determining that the first quality of service does not equal or exceed the threshold quality of service, the media guidance application may generate for display an option to automatically download the first media asset to the server when the first quality of service equals or exceeds the threshold quality of service, wherein the downloaded first media asset is available for on-demand playback on the user device.

In some aspects, the media guidance application may determine which media listings, if any, to present to a user based on the quality of service. For example, in order to preserve a high quality user experience, the media guidance application may only present media listings corresponding to a certain quality of service.

The media guidance application may receive, at a server, a request from a user device, over a communications network, to access media assets from a cloud-based aggregator, wherein the media assets are available from a plurality of over-the-top content providers. For example, a user may wish to stream a movie to his or her mobile phone or personal computer.

The media guidance application may determine, at the server, a first content provider of the plurality of over-the-top content providers that provides a media asset. For example, the media guidance application may retrieve a user profile associated with the user device and retrieve subscription data for the user profile, wherein the subscription data indicates a user subscribes to each of the plurality of over-the-top content providers. The media guidance application may then search each of the plurality of over-the-top content providers to determine whether each of the plurality of over-the-top content providers provides the media asset based on the subscription data.

The media guidance application may also determine, at the server, a second content provider of the plurality of over-the-top content providers that provides the media asset. For example, the media guidance application may retrieve a list of all media assets available from each of the subscription services associated with the user device.

The media guidance application may determine, at the server, a first quality of service for the user device to receive the media asset from the first content provider. For example, based on current network conditions, the media guidance application may determine a error rate at which the user device may access the media asset from the first content provider. For example, the media guidance application may query a user device for a checksum value and receive the checksum value from the user device in response to the query.

The media guidance application may determine, at the server, a second quality of service for the user device to receive the media asset from the second content provider. For example, based on current network conditions, the media guidance application may determine an error rate at which the user device may access the media asset from the second content provider as well.

The media guidance application may retrieve, at the server, a threshold quality of service. For example, the media guidance application may test for and determine whether or not certain criteria meet threshold criteria. If so, specific actions may be triggered.

The media guidance application may compare, at the server, both the first quality of service and the second quality of service to the threshold quality of service. For example, for each content provider to which a subscription and/or access is available, the media guidance application may determine whether or not the quality of service exceeds a threshold quality of service.

The media guidance application may determine, at the server, that the first quality of service equals or exceeds the threshold quality of service and that the second quality of service does not equal or exceed the threshold quality of service. For example, the media guidance application may determine that the error rate associated with receiving content from the first content provider is acceptable, whereas the error rate associated with receiving content from the second content provider is not acceptable.

In response to determining that the first quality of service equals or exceeds the threshold quality of service and that the second quality of service does not equal or exceed the threshold quality of service, the media guidance application may generating for display a first media listing for the media asset from the first content provider and not generating for display a second media listing for the media asset from the second content provider. Additionally, the media guidance application may generate for display a notification for accessing the media asset from the second content provider, wherein the notification indicates that the second quality of service is lower than the threshold quality of service. Accordingly, the media guidance application may only present media listings that preserve a high quality user experience.

In some embodiments, the media guidance application determines, at the server, a third content provider of the plurality of over-the-top content providers that provides the media asset. For example, the third content provider may include a publically available streaming media provider that does not require a subscription. The media guidance application may determine a third quality of service for the user device to receive the media asset from the first content provider and compare the third quality of service to the threshold quality of service. The media guidance application may determine that the third quality of service equals or exceeds the threshold quality of service. In response to determining that the third quality of service equals or exceeds the threshold quality of service, the media guidance application may generate for display a third media listing for the media asset from the third content provider simultaneously with the first media listing.

In some embodiments, the first quality of service is based on one or more quality of service characteristics, and the quality of service characteristics include an error rate, bit rate, throughput lag, transmission delay, availability, or jitter experienced by the user device. Moreover, the media guidance application may determine the first quality of service comprises determining a first quality of service characteristic and a second quality of service characteristic (e.g., error rate and bit rate), assign a first weight to the first quality of service characteristic and a second weight to the second quality of service characteristic (e.g., based on user preferences), and determine a weighted average for the first quality of service characteristic and the second quality of service characteristic (e.g., a weighted average that represents the overall quality of service based on the characteristics).

In some embodiments, the media guidance application may determine qualitative or quantitative quality of service ratings for each content provider. For example, the media guidance application may input the first quality of service into a database listing ratings corresponding to different quality of services. The media guidance application may then compare the first quality of service to the different quality of services to determine a rating for the first quality of service, and generating for display the rating simultaneously with the media listing.

In some embodiments, the media guidance application may, in response to determining that the first quality of service does not equal or exceed the threshold quality of service, generate for display an option to receive an alert when the first quality of service equals or exceeds the threshold quality of service. For example, in order to preserve the high quality user experience, the media guidance application may alert the user as to when the media listing will correspond to a threshold quality of service. Additionally or alternatively, the media guidance application may, in response to determining that neither the first quality of service nor the second quality of service equals or exceeds the threshold quality of service, generates for display an option to automatically download the first media asset to the server, wherein the downloaded first media asset is available for on-demand playback on the user device. For example, if streaming a media asset is not preferable due to the quality of service, the media guidance application may download the media asset for later viewing by the user.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 shows an illustrative media listing display that may be used to provide media listings from a plurality of content providers to users in a single interface in accordance with some embodiments of the disclosure;

FIG. 2 shows another illustrative display that may be used to provide a media asset and recommendations of other media assets in accordance with some embodiments of the disclosure;

FIG. 11 is an illustrative example of pseudocode for comparing the quality of service to a threshold quality of service in accordance with some embodiments of the disclosure;

FIG. 13 is a flow-chart of illustrative steps for determining quality of service for a plurality of content providers from which a media asset is available in accordance with some embodiments of the disclosure.

DETAILED DESCRIPTION OF THE DRAWINGS

Figure 3:
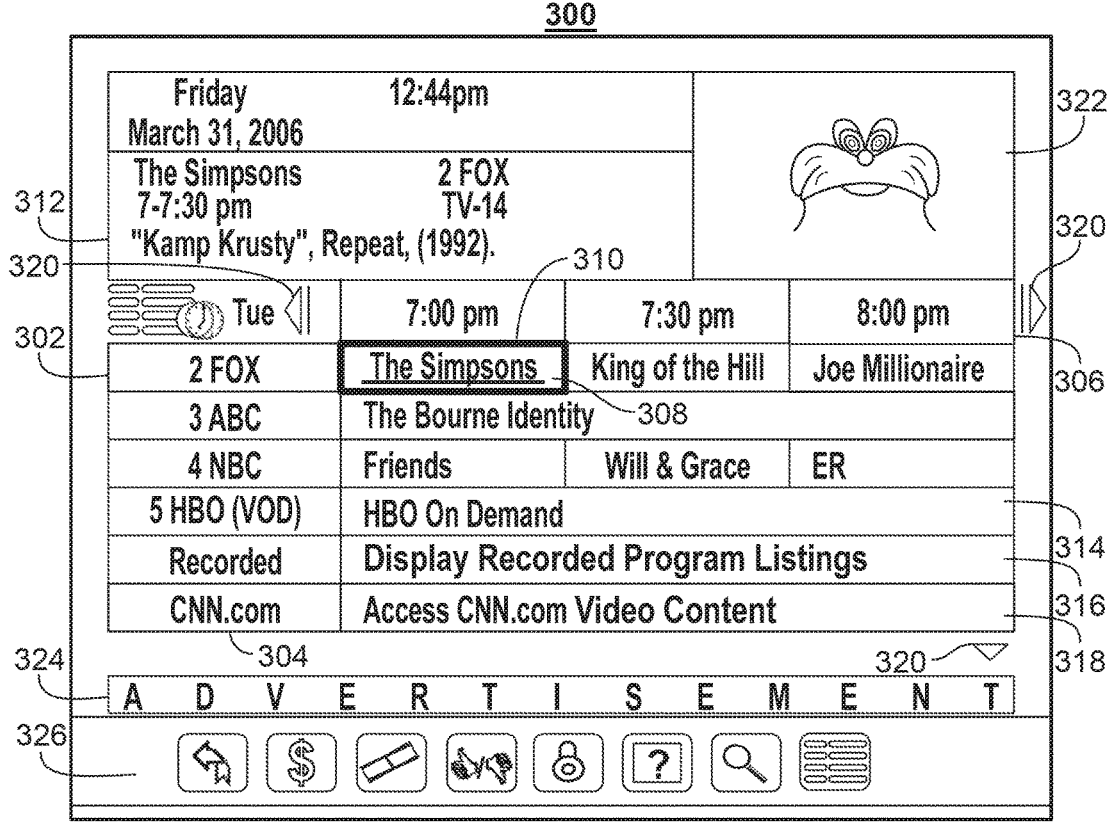
FIG. 3 shows another illustrative media listing display in accordance with some embodiments of the disclosure.

Methods and systems are described herein for a media guidance application that aggregates media content for users viewing over-the-top content. For example, the media guidance application may aggregate content from numerous providers and provide the content through a single interface. Moreover, the media guidance application described herein may identify a media asset available from at least one of a plurality of content providers, and may recommend the media asset to the user based on the quality of service at a user device associated with the at least one of the plurality of content providers.

An application that allows users, through an interface, to efficiently navigate content selections and easily identify content that they may desire is referred to herein as an interactive media guidance application or, sometimes, a media guidance application or a guidance application. Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

One type of content is over-the-top content. As referred to herein, "over-the-top content" or "OTT content" is media content delivered over a network using Internet technology (e.g., via the Internet or a managed network). In some embodiments, OTT content may be delivered without the involvement of a multiple-system operator in the control or distribution of the content. For example, OTT content may include a media asset (e.g., a movie) that is streamed to a user over the Internet.

In some embodiments, the OTT content may be provided through a platform that aggregates content from numerous providers. A platform that provides such a feature may be referred to as a super aggregator or a content aggregator or, sometimes, cloud-based aggregator. For example, the super aggregator may provide a single interface through which a user may access, search, and/or otherwise receive information about media content from numerous media content providers and media guidance data from a media guidance data source. Such an interface is referred to herein as a media guidance application.

As described herein, a media guidance application may verify a quality of service between a user device and one or more content providers. As referred to herein, "quality of service" refers to the quality, as received by an end user, in a telephone or computer network. The quality of service may be measured by and/or reflect one or more aspects of network services, such as error rates, bit rate, throughput lag, transmission delay, availability, jitter, etc. as seen from the viewpoint of the sender or receiver of information.

As described in Peuhkuri M., *IP Quality of Service*, Helsinki University of Technology, Laboratory of Telecommunications Technology, 1999, which is herein incorporated by reference, in packet-switched networks, quality of service is affected by various factors, which can be divided into "human" and "technical" factors. Human factors include stability of service, availability of service, delays, and user information. Technical factors include: reliability, scalability, effectiveness, maintainability, grade of service, etc.

The quality of service may be based on a minimum bandwidth and maximum delay that is acceptable. For example, a particular application (e.g., an application that includes videoconferencing and thus places high demands on the network) may have different acceptable minimum bandwidth and maximum delay than another application (e.g., an application that is limited to textual data transmission and thus has lower demands on the network). For example, in order to determine a guaranteed quality of service associated with different content providers, the media guidance application may compare the available bandwidth and maximum delay associated with each content provider. For example, for each content provider, the media guidance application may use the following formula to calculate maximum delay, $d_{max}$, where b is a token bucket depth, r is a bucket rate, p is a token bucket plus peak rate, M is a maximum datagram size, R is a bandwidth allocated to connection, $C_{tot}$ is a end-to-end sum of rate-dependent error terms, and $D_{tot}$ is a end-to-end sum of rate-independent, per-element error terms.

$$d_{max}=((b-M)/R)*(p-R)/(p-r)+(M+C_{tot})/(R+D_{tot}),$$
$$p>R\geq r$$

$$d_{max}=((b-M)/R)*(p-R)/(p-r))+(M+C_{tot})/(R+D_{tot}),$$
$$r\leq p\leq R$$

The media guidance application may then compare the quality of service for different content providers of the same media asset to determine which content provider of a particular media asset provides the highest quality of service to a user device. Based on this comparison, the media guidance application may select which content provider to use to offer a user device access to a media asset, may rank the various content providers, or may determine whether or not a media asset from the content provider should be offered to a user, as discussed below.

For example, quality of service may refer to a performance level that is required in order to provide particular types of content. For example, the delivery of content in a larger size or particular format may be more demanding on a network. Accordingly, to deliver such content to a user, the computer network may require a higher performance or achieved service quality (e.g., a high bit rate, low latency, and low bit error probability). The media guidance application may verify that the performance level offered using a specific content provider is acceptable before the media guidance application offers media assets from that content provider for consumption by a user. By providing this verification service, the media guidance application ensures a high level of user experience. For example, because the performance level has been verified, the media guidance application will not facilitate a connection to a content provider that will result in a low quality of service and poor user experience.

To test for the various variables in determining quality of service, the media guidance application may measure bandwidth, jitter, latency, and packet loss. For example, the media guidance application may incorporate and/or have access to one or more modules to test for each characteristic of the quality of service. The testing may include querying one or more devices to generate statistics such as out-of-sequence counts and detecting errors in data packets such as checksum errors (e.g., according to a parity byte or parity word algorithm, modular sum algorithm, position-dependent algorithm, etc.). Additionally, the media guidance application may ping one or more devices for data to determine these measurements. For example, in order to test latency, the media guidance application may test both the near-end to far-end and the far-end to the near-end directions simultaneously.

In some embodiments, the media guidance application may determine a quality of service based on the weighted averages of one or more characteristics of the quality of service. As referred to herein, a "characteristic" of the quality of service is any variable that affects the quality of service. For example, the characteristics may include error rates, bit rate, throughput lag, transmission delay, availability, jitter, etc. as seen from the viewpoint of the sender or receiver of information. Additionally or alternatively, the characteristics may include any variable used to determine a maximum delay in a guaranteed quality of service, as discussed above. Moreover, the characteristics that are used to determine the quality of service may vary. For example, the media guidance application may select only characteristics for which statistical data may be generated, or for which the media guidance application may verify through suitable means. Additionally or alternatively, the characteristics may be selected based on industry standards, user selections, or a factory default.

Furthermore, the media guidance application may weigh each of these characteristics differently when determining the quality of service. For example, particular characteristics may in some situations be more indicative of the quality of service. For example, the data used to measure a first characteristic may be more precise, more accurate, more robust, etc. than the data used to measure a second characteristic. Accordingly, the media guidance appliance may weigh the first characteristic more heavily than the second characteristic in the determination of the quality of service.

It should also be noted that the quality of service (or the measurements of particular characteristics) may be determined continually or at predetermined times, and/or in response to particular inputs. For example, the media guidance application may continuously determine the quality of service for a user device to receive media assets from different content providers. At any time that the media guidance application requires the quality of service (e.g., in order to generate media listings from a particular content provider), the media guidance application may retrieve the current quality of service. Alternatively or additionally, the media guidance application may determine the quality of service at predetermined times (e.g., on the hour, each hour). Alternatively or additionally, the media guidance application may determine the quality of service in response to a user request to access media assets, access an aggregation of content providers, accessing the media guidance application, turning on a user device, etc.

In some embodiments, the media guidance application may retrieve a threshold quality of service. A threshold quality of service may be any quality of service that triggers a particular action by the media guidance application. For example, the threshold quality of service may be based on an industry standard, a user selection, or a factory default. Moreover, the threshold quality of service may dynamically change depending on overall network conditions and/or user selections. For example, when network conditions become strained (e.g., there is an increased load on the system), the threshold quality of service may be decreased to allow for more media assets to be available to the user. Alternatively, when network conditions become strained, the threshold quality of service may be increased to ensure that the user experience is not affected by the network conditions. Likewise, when the user elects to lower the potential demand on the network (e.g., request only standard definition media assets), the threshold quality of service may be adjusted to reflect the lower demand on the network.

As referred to herein, "content providers," or "service providers," are third-party entities that provide media content. For example, content providers may be third-party entities that provide movies, music, and other media content to users. A content provider may be unaffiliated with the cloud-based aggregator. A content provider may be in a contractual relationship with the cloud-based aggregator. For example, the content provider may be in an agreement to provide the cloud-based aggregator with information about users in return for some compensation. A content provider may be in a contractual relationship with the user and not the cloud-based aggregator. For example, the content provider may be subscribed to by users and may not have any agreement with the cloud-based aggregator.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e. provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

FIGS. 1-2 show illustrative display screens that may be used to provide media guidance data. For example, the displays of FIGS. 1-2 may present media assets available from a plurality of content providers. For example, the media guidance application may aggregate content from numerous providers and provide the content through a single interface. The single interface may further facilitate coordination between various content providers by allowing users to simultaneously search through the media content libraries of each content provider and receive media recommendations. Furthermore, in order to provide the best possible user experience, the media guidance application may filter and/or select which media listings to present to a user based on the quality of service associated with a content provider for any given media asset. For example, the media guidance application may select a single media listing, corresponding to a single content provider, for display, despite the face that numerous content providers offer the media asset based on the single content provider providing the best quality of service. Alternatively, the media guidance application may graphically accentuate (e.g., adjust the order, positioning, size, coloring, shading, font, image, transparency, or other suitable criteria) media listings, from a plurality of content providers, for the same media asset in a single display.

The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by content type, by category (e.g., movies, sports, news, children, or other categories of programming), or other predefined, user-defined, or other organization criteria.

FIG. 1 shows an illustrative media listing display that may be used to provide media listings from a plurality of content providers to users in a single interface. Display 100 includes rows 112, 114, 116, and 118 each of which includes cells of selectable media listings, such as movie 120. The selectable media listings may include titles or other text below the images. The selectable media listings may be provided by a plurality of content providers. The content providers for the various selectable media listings may not be shown.

Display 150 includes header 102 with: (1) logo 104, which may be associated with the super aggregator; (2) selectable options 106 for selecting content by type, genre, and/or other organization criteria; (3) search box 108 for searching content by text; and (4) user settings 110 for accessing and editing user information and preferences. Rows 112, 114, 116, and 118 include cells of selectable media listings, such as movie 120, where each selectable media listing provides graphical images including cover art, still images from the content, video clip previews, live video from the content, or other types of content that indicate to a user the content being described by the media guidance data in the listing. With a user input device, a user can select media listings by moving a highlighted region to the media listing or by clicking on the media listing. Selecting a media listing from display 100 may cause the display to change to include information related to the selected media listing (e.g., display 250 (FIG. 2)).

The media guidance application provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g., FTP).

Another display arrangement for providing media listings from a plurality of content providers to users in a single interface is shown in FIG. 2. Display 200 includes recommendations region 216. For example, the recommendations region 216 may be populated with recommendations for media assets. The media guidance application may determine which media assets to recommend based on a user profile for the user. Furthermore, the content provider that provides the media assets may not be shown.

Display 250 may include header 202 with: (1) logo 204, which may be associated with the super aggregator; (2) selectable options 206 for selecting content by type, genre, and/or other organization criteria; (3) search box 208 for searching content by text; and (4) user settings 210 for accessing and editing user information and preferences. Display 250 also includes media region 212, information region 214, and recommendations region 216. Media region 212 may include a media asset and may be selectable to view content in full-screen. Information region 214 may include information associated with the media asset, for example, the title, description, duration, rating, and other desired information. Recommendations region 216 may provide media listings with graphical images 218a, 218b, and 218c, including cover art, still images from the content, video clip previews, live video from the content, or other types of content that indicate to a user the content being described by the media guidance data in the listing. Each of the media listings may also be accompanied by text 220a, 220b, and 220c to provide further information about the content associated with the listing. Price indicator 222a provides the price associated with a subscription to a content provider from which the content described in the listing is available. In some embodiments, price indicator 222a may be placed over graphical image 218a. In some embodiments, price indicator 222a may be placed near graphical image 218a in the media listing.

The media listings in display 250 are of the same size, but, if desired, the listings may be of different sizes. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
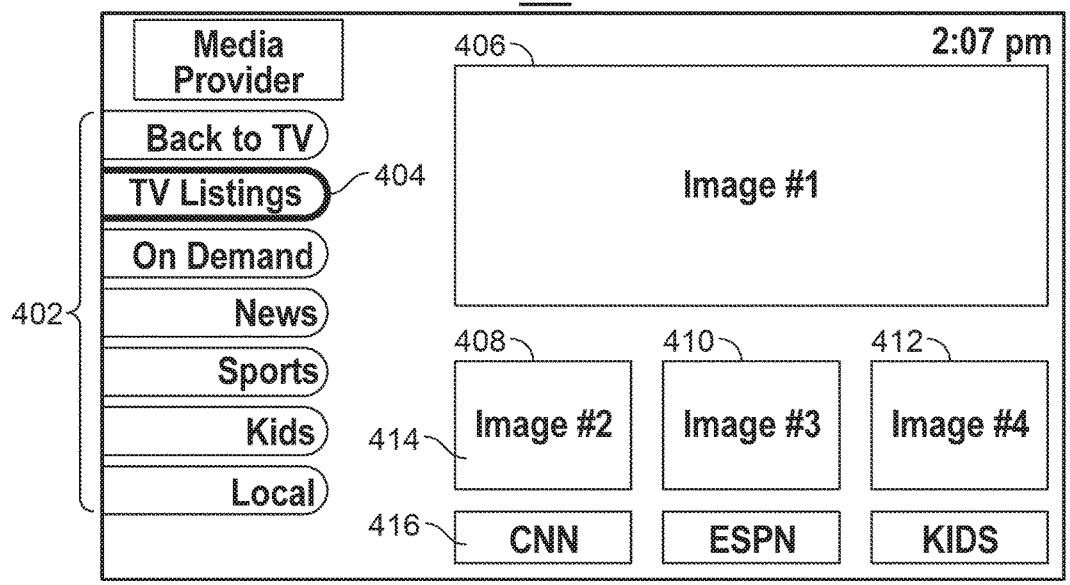
FIG. 4 shows another illustrative media listing display in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows an illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, advertisement 324, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 324 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 302. Advertisement 324 may also be for products or services related or unrelated to the content displayed in grid 302. Advertisement 324 may be selectable and provide further information about content, provide information about a product or a service, enable purchasing of content, a product, or a service, provide content relating to the advertisement, etc. Advertisement 324 may be targeted based on a user's profile/preferences, monitored user activity, the type of display provided, or on other suitable targeted advertisement bases.

While advertisement 324 is shown as rectangular or banner shaped, advertisements may be provided in any suitable size, shape, and location in a guidance application display. For example, advertisement 324 may be provided as a rectangular shape that is horizontally adjacent to grid 302. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
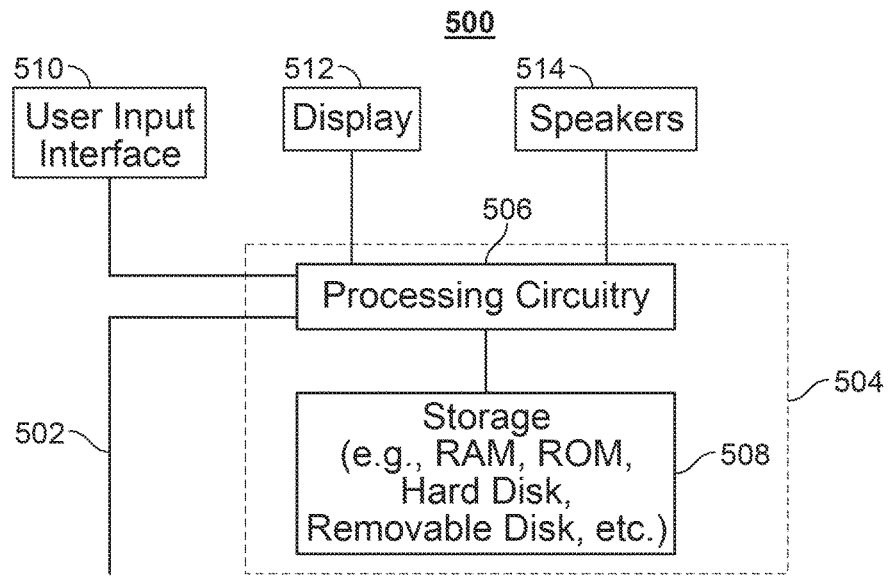
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
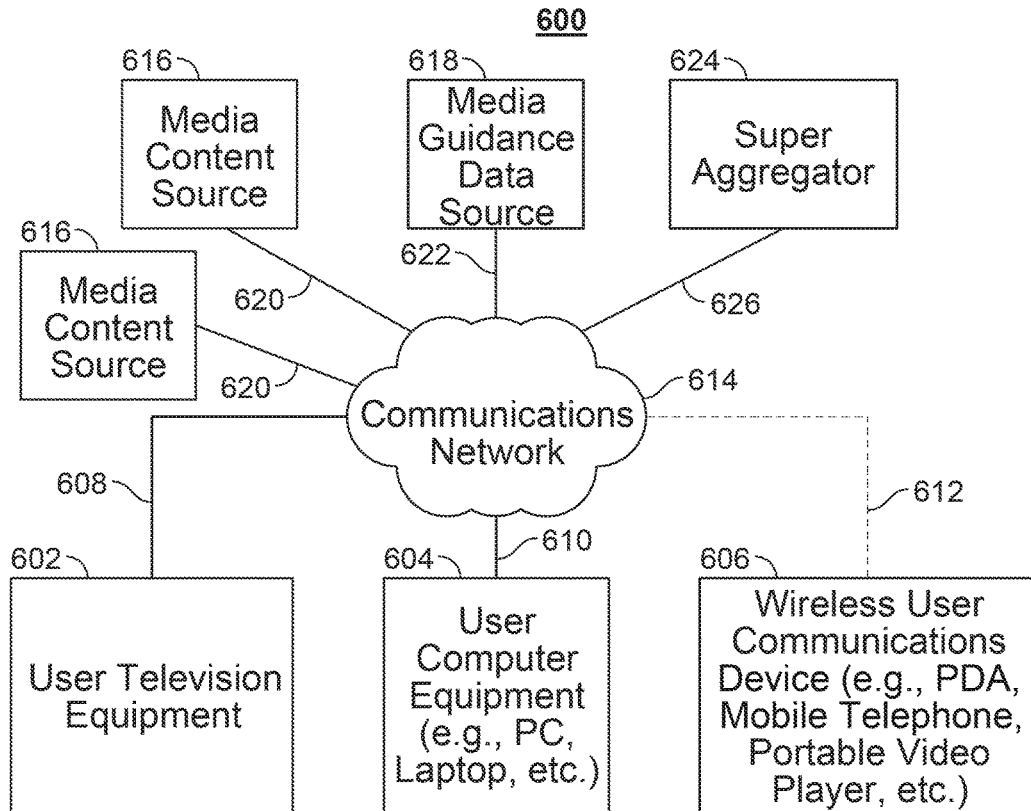
FIG. 6 is a block diagram of an illustrative media network in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 6G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1596 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes a super aggregator 624 coupled to communications network 614 via communication path 626. Path 626 may include any of the communication paths described above in connection with paths 608, 610, and 612. Communications with the super aggregator 624 may be exchanged over one or more communications paths, but are shown as a single path in FIG. 6 to avoid overcomplicating the drawing. Although communications between super aggregator 624 with user equipment devices 602, 604, and 606 are shown as through communications network 614, in some embodiments, super aggregator 624 may communicate directly with user equipment devices 602, 604, and 606 via communication paths (not shown) such as those described above in connection with paths 608, 610, and 612.

System 600 includes content sources 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than two of content source 616, but only two are shown in FIG. 6 to avoid overcomplicating the drawing. In addition, there may be more than one of media guidance data source 618, but only one is shown in FIG. 6 to avoid overcomplicating the drawing. (The different types of each of these sources are discussed below.) If desired, a content source 616 and a media guidance data source 618 may be integrated as one source device. Although communications between sources 616 and 618 with super aggregator 624 are shown as through communications network 614, in some embodiments, sources 616 and 618 may communicate directly with super aggregator 624 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

In some embodiments, media guidance data from media guidance data sources 618 and media content from media content sources 616 may be provided to users' equipment by the super aggregator 624. For example, a user equipment device may pull media guidance data and other content from the super aggregator 624 or the super aggregator 624 may push media guidance data and other content to a user equipment device. In addition, the super aggregator 624 may pull media guidance data from media guidance data sources 618 and media content from media content sources 616, or media guidance data sources and media content sources may push media guidance data sources and media content, respectively, to the super aggregator 624.

In some embodiments, the super aggregator 624 may filter media content received from content providers before providing the media content to the users' equipment. Similarly, the super aggregator 624 may filter media guidance data received from media guidance data sources before providing the media content to the users' equipment. For example, the super aggregator may remove any indication of the content provider from media content and media guidance data before providing them to users.

In some embodiments, the super aggregator 624 may provide media content and media guidance data from media content sources and media guidance data sources, respectively, by email or phone to users. For example, the super aggregator may provide a media asset's availability and price by email to users.

Media guidance applications may be, for example, standalone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,066,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, e.g., in an approach with a super aggregator 624, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include a super aggregator 624, also referred to herein as "cloud-based aggregator," which may provide users with media content from media content sources 616 and media guidance data from media guidance data sources 618. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred to herein, the term "in response to" refers to initiated as a result of. For example, a first action being performed in response to another action may include interstitial steps between the first action and the second action. As referred to herein, the term "directly in response to" refers to caused by. For example, a first action being performed directly in response to another action may not include interstitial steps between the first action and the second action.

As referred to herein, the term "generating for display" means causing, directly or indirectly, the display of media content on a device whether or not the device upon which the media content is displayed is the device that causes the media content to be generated for display. For example, a set-top box may generate for display a media asset by using control circuitry (e.g., graphics processing unit) to generate a signal to be sent to a display device (e.g., TV) to display the media asset. In this example, the set-top box generates the signal used by the display device to display the media asset, therefore the set-top box generates for display the media asset.

Figure 7:
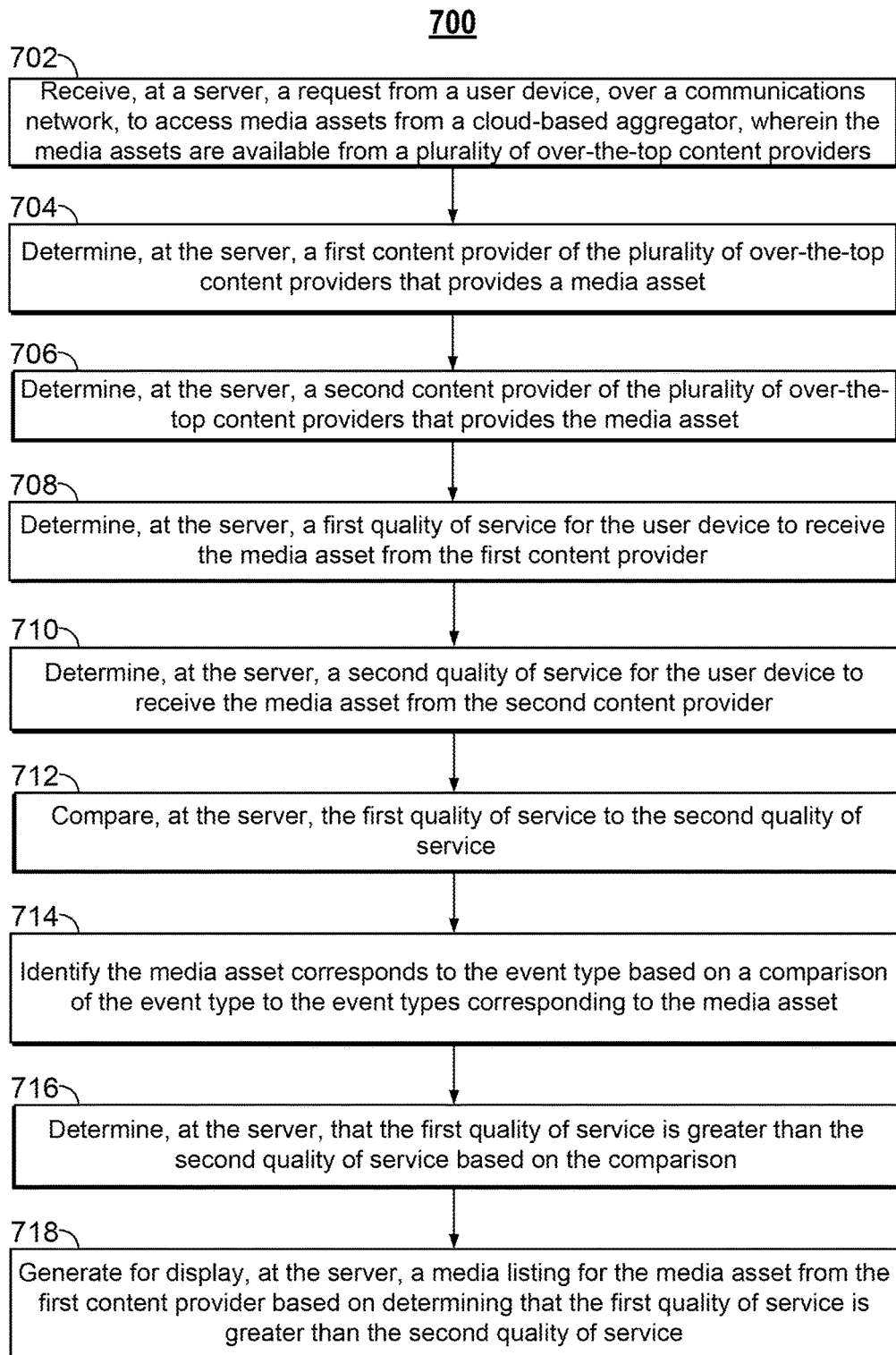
FIG. 7 is a flow-chart of illustrative steps for selecting providers of media content in accordance with some embodiments of the disclosure.

FIG. 7 is a flowchart of illustrative steps for selecting providers of media content. It should be noted that process 700 or any step thereof could be performed on, or provided by, any of the devices shown in FIGS. 5-6. For example, process 700 may be executed by control circuitry 504 (FIG. 5) as instructed by a media guidance application implemented on user equipment 602, 604, and/or 606 (FIG. 6) in order to select providers of media content. In addition, one or more steps of process 700 may be incorporated into or combined with one or more steps of any other process or embodiment (e.g., as described in relation to FIGS. 8-13).

In process 700, the media guidance application selects providers of media content. At step 702, the media guidance application receives (e.g., via user i/o path 502 (FIG. 5)), at a server (e.g., super aggregator 624 (FIG. 6)), a request from a user device, over a communications network (e.g., communications network 614 (FIG. 6)), to access media assets from a cloud-based aggregator, wherein the media assets are available from a plurality of over-the-top content providers. For example, a user may remotely access a media guidance application that aggregates content from multiple sources on a mobile device.

At step 704, the media guidance application determines (e.g., via control circuitry 504 (FIG. 5)), at the server (e.g., super aggregator 624 (FIG. 6)), a first content provider (e.g., media content source 616 (FIG. 6)) of the plurality of over-the-top content providers that provides a media asset. For example, the media guidance application may determine the media assets currently available from a website that allows users to stream media content.

At step 706, the media guidance application determines (e.g., via control circuitry 504 (FIG. 5)), at the server (e.g., super aggregator 624 (FIG. 6)), a second content provider (e.g., media content source 616 (FIG. 6)) of the plurality of over-the-top content providers that provides the media asset. For example, the media guidance application may determine the media assets currently available from a second website that also allows users to stream media content. Moreover, the media guidance application may determine that the two websites both offer the same media asset.

At step 708, the media guidance application determines (e.g., via control circuitry 504 (FIG. 5)), at the server (e.g., super aggregator 624 (FIG. 6)), a first quality of service for the user device to receive the media asset from the first content provider. For example, the media guidance application may query the user device for a checksum value and receive the checksum value from the user device in response to the query. For example, the media guidance application may determine the error rate for receiving content from the first website.

At step 710, the media guidance application determines (e.g., via control circuitry 504 (FIG. 5)), at the server (e.g., super aggregator 624 (FIG. 6)), a second quality of service for the user device to receive the media asset from the second content provider. For example, the media guidance application may determine the error rate for receiving content from the first website.

At step 710, the media guidance application compares (e.g., via control circuitry 504 (FIG. 5)), at the server (e.g., super aggregator 624 (FIG. 6)), the first quality of service to the second quality of service. For example, the media guidance application may determine which website will allow the user to obtain the same media asset with a lower error rate.

At step 712, the media guidance application determines (e.g., via control circuitry 504 (FIG. 5)), at the server (e.g., super aggregator 624 (FIG. 6)), that the first quality of service is greater than the second quality of service based on the comparison. For example, the media guidance application may compare the error rate corresponding to the first website to the error rate corresponding to the second website.

At step 714, the media guidance application generates for display (e.g., via control circuitry 504 (FIG. 5)), at the server (e.g., super aggregator 624 (FIG. 6)), a media listing (e.g., movie 120 (FIG. 1)) for the media asset from the first content provider based on determining that the first quality of service is greater than the second quality of service. For example, instead of presenting duplicate media listings (e.g., two listings corresponding to the same media asset in which each media listing corresponds to a different media content provider), the media guidance application may automatically (e.g., without requiring any testing and/or further user inputs) select the media listing that provides the user with the best user experience (e.g., provides the best quality of service).

In some embodiments, the quality of service may be based on one or more quality of service characteristics such as an error rate, bit rate, throughput lag, transmission delay, availability, or jitter experienced by the user device. Moreover, in some embodiments, the media guidance application may determine a first quality of service characteristic and a second quality of service characteristic. For example, the media guidance application may determine quality of service based on multiple factors. The media guidance application may assign a first weight to the first quality of service characteristic and a second weight to the second quality of service characteristic. For example, the media guidance application may weigh the factors according to the amount at which the factors affect the user experience, industry standards, and/or user preferences. The media guidance application may then determine a weighted average for the first quality of service characteristic and the second quality of service characteristic. For example, after quantifying the first and second characteristics and applying the respective weights, the media guidance application may determine a sum of the weighted first and second characteristics to determine the quality of service.

In some embodiments, the media guidance application may rate the various quality of services. For example, the media guidance application may input the first quality of service into a database listing ratings corresponding to different quality of services. The media guidance application may compare the first quality of service to the different quality of services to determine a rating for the first quality of service. The media guidance application may then generate for display the rating simultaneously with the media listing. For example, in addition, or as an alternative to, presenting a media listing available from only the content provider that has the best quality of service, the media guidance application may present a quality of service rating along with each media listing. Additionally or alternatively, the media guidance application may generate a notification for accessing the media asset from the second content provider, wherein the notification indicates that the second quality of service is lower than the first quality of service. For example, the media guidance application may present a notification to a user indicating additional sources of a media asset and the respective quality of service (or quality of service rating) corresponding to the other sources.

In some embodiments, in response to determining that the first quality of service is equal to the second quality of service based on the comparison, the media guidance application may generate for display the media listing for the media asset from the first content provider and a different media listing for the media asset from the second content provider. For example, the media guidance application may present media listings from a plurality of sources.

In some embodiments, the media guidance application may determine the available media content providers to aggregate based on a user's subscription status. For example, the media guidance application may retrieve a user profile associated with the user device such as a mobile phone. The media guidance application may retrieve subscription data for the user profile, wherein the subscription data indicates a user subscribes to each of the plurality of over-the-top content providers. For example, the user profile may include a list of each media content provider that the user currently subscribes to and/or whether or not a user is currently subscribing to various media content providers. The media guidance application searches each of the plurality of over-the-top content providers to determine whether each of the plurality of over-the-top content providers provides the media asset based on the subscription data. For example, in response to determine that a user subscribes to (e.g., is allowed accessed to) media assets from a content providers. The media guidance application searches the media content provider for available media assets.

In some embodiments, the media guidance application may apply special thresholds to determine whether or not to present a media listing. For example, the media guidance application may retrieve a threshold quality of service. For example, a minimum acceptable quality of service for which a media listing will be presented. The media guidance application may compare the first quality of service to the threshold quality of service, and, in response to determining that the first quality of service does not equal or exceed the threshold quality of service, the media guidance application may generate for display an option to receive an alert when the first quality of service equals or exceeds the threshold quality of service. Alternatively, in response to determining that the first quality of service does not equal or exceed the threshold quality of service, the media guidance application may generate for display an option to automatically download the first media asset to the server when the first quality of service equals or exceeds the threshold quality of service, wherein the downloaded first media asset is available for on-demand playback on the user device.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 7.

Figure 8:
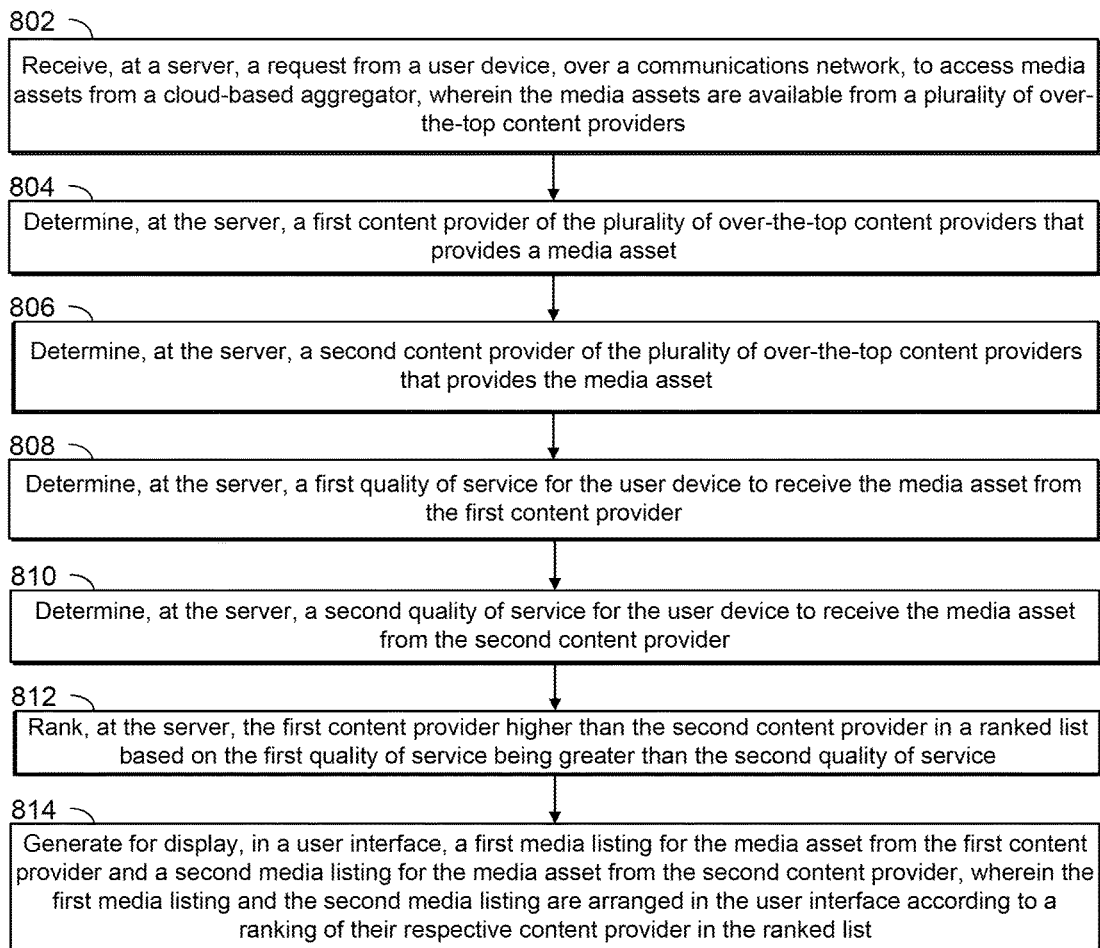
FIG. 8 is a flow-chart of illustrative steps of arranging over-the-top content in user interfaces in accordance with some embodiments of the disclosure.

FIG. 8 is a flowchart of illustrative steps of arranging over-the-top content in user interfaces. It should be noted that process 800 or any step thereof could be performed on, or provided by, any of the devices shown in FIGS. 5-6. For example, process 800 may be executed by control circuitry 504 (FIG. 5) as instructed by a media guidance application implemented on user equipment 602, 604, and/or 606 (FIG. 6) in order to arrange over-the-top content in user interfaces. In addition, one or more steps of process 800 may be incorporated into or combined with one or more steps of any other process or embodiment (e.g., as described in relation to FIGS. 7 and 9-13).

In process 800, the media guidance application arranges over-the-top content in user interfaces. At step 802, the media guidance application receives (e.g., via control circuitry 504 (FIG. 5)), at a server (e.g., super aggregator 624 (FIG. 6)), a request from a user device (e.g., user equipment 602 (FIG. 6)), over a communications network (e.g., communications network 614 (FIG. 6)), to access media assets from a cloud-based aggregator, wherein the media assets are available from a plurality of over-the-top content providers. For example, the media guidance application may receive a request from a mobile device requesting access to a library of media assets from numerous streaming media providers over the Internet.

At step 804, the media guidance application determines (e.g., via control circuitry 504 (FIG. 5)), at the server (e.g., super aggregator 624 (FIG. 6)), a first content provider (e.g., media content source 616 (FIG. 6)) of the plurality of over-the-top content providers that provides a media asset. For example, the media guidance application may retrieve a user profile associated with the user device and retrieve subscription data for the user profile, wherein the subscription data indicates that a user subscribes to each of the plurality of over-the-top content providers. The media guidance application may then search each of the plurality of over-the-top content providers to determine whether each of the plurality of over-the-top content providers provides the media asset based on the subscription data.

At step 806, the media guidance application determines (e.g., via control circuitry 504 (FIG. 5)), at the server (e.g., super aggregator 624 (FIG. 6)), a second content provider (e.g., media content source 616 (FIG. 6)) of the plurality of over-the-top content providers that provides the media asset. For example, the media guidance application may determine that a first streaming media provider (e.g., associated with a broadcast television network) and a second streaming media provider (e.g., associated with a website of user-uploaded content) both offer access to the same media asset.

At step 808, the media guidance application determines (e.g., via control circuitry 504 (FIG. 5)), at the server (e.g., super aggregator 624 (FIG. 6)), a first quality of service for the user device (e.g., user equipment 602 (FIG. 6)) to receive the media asset (e.g., movie 120 (FIG. 1)) from the first content provider (e.g., media content source 616 (FIG. 6)). For example, based on current network conditions, the media guidance application may determine a bit rate at which the user device may access the media asset from the first content provider. For example, the media guidance application may query a user device for a checksum value and receive the checksum value from the user device in response to the query.

At step 810, the media guidance application determines (e.g., via control circuitry 504 (FIG. 5)), at the server (e.g., super aggregator 624 (FIG. 6)), a second quality of service for the user device (e.g., user equipment 602 (FIG. 6)) to receive the media asset from the second content provider (e.g., media content source 616 (FIG. 6)). For example, based on current network conditions, the media guidance application may determine a bit rate at which the user device may access the media asset from the second content provider as well.

At step 812, the media guidance application may rank (e.g., via control circuitry 504 (FIG. 5)), at the server (e.g., super aggregator 624 (FIG. 6)), the first content provider higher than the second content provider in a ranked list based on the first quality of service being greater than the second quality of service. For example, in order to provide the best user experience (e.g., ensure that the user selects to receive a media asset from a content provider providing the best bit rate), the media guidance application may rank the content providers based on their respective quality of service.

At step 814, the media guidance application generates for display (e.g., via control circuitry 504 (FIG. 5)), in a user interface (e.g., display 100 (FIG. 1)), a first media listing (e.g., movie 120 (FIG. 1)) for the media asset from the first content provider and a second media listing for the media asset from the second content provider, wherein the first media listing and the second media listing are arranged in the user interface according to a ranking of their respective content provider in the ranked list. For example, while the media guidance application may present media listings corresponding to the media asset from both content providers, the media guidance application may arrange the listings in an order that reflects their respective quality of services. Accordingly, a user may determine in an intuitive way, which content provider will provide the media asset with the best quality of service.

In some embodiments, the first quality of service is based on one or more quality of service characteristics, and the quality of service characteristics include an error rate, bit rate, throughput lag, transmission delay, availability, or jitter experienced by the user device. Moreover, the media guidance application may determine the first quality of service comprises determining a first quality of service characteristic and a second quality of service characteristic (e.g., error rate and bit rate), assign a first weight to the first quality of service characteristic and a second weight to the second quality of service characteristic (e.g., based on user preferences), and determine a weighted average for the first quality of service characteristic and the second quality of service characteristic (e.g., a weighted average that represents the overall quality of service based on the characteristics).

In some embodiments, the media guidance application may determine qualitative or quantitative quality of service ratings for each content provider. For example, the media guidance application may input the first quality of service into a database listing ratings corresponding to different quality of services. The media guidance application may then compare the first quality of service to the different quality of services to determine a rating for the first quality of service, and generating for display the rating simultaneously with the media listing.

In some embodiments, the media guidance application may graphically accentuate one media listing over another based on a quality of service associated with a content provider providing that media asset. For example, the media guidance application may present the media listings in a mosaic display, wherein the first media listing corresponds to a first mosaic cell and the second media listing corresponds to a second mosaic cell and the first mosaic cell is more prominently displayed than the second mosaic cell.

In some embodiments, the media guidance application may test for and determine whether or not certain criteria meet threshold criteria. If so, specific actions may be triggered. For example, the media guidance application may retrieve a threshold quality of service (e.g., corresponding to a first content provider), and compare the first quality of service to the threshold quality of service. In response to determining that the first quality of service equals or exceeds the threshold quality of service, the media guidance application may add the first media listing to the ranked list. Alternatively or additionally, the media guidance application, in response to determining that the first quality of service does not equal or exceed the threshold quality of service, may generate for display an option to receive an alert when the first quality of service equals or exceeds the threshold quality of service. Alternatively or additionally, in response to determining that the first quality of service does not equal or exceed the threshold quality of service, the media guidance application may generate for display an option to automatically download the first media asset to the server when the first quality of service equals or exceeds the threshold quality of service, wherein the downloaded first media asset is available for on-demand playback on the user device.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 8.

Figure 9:
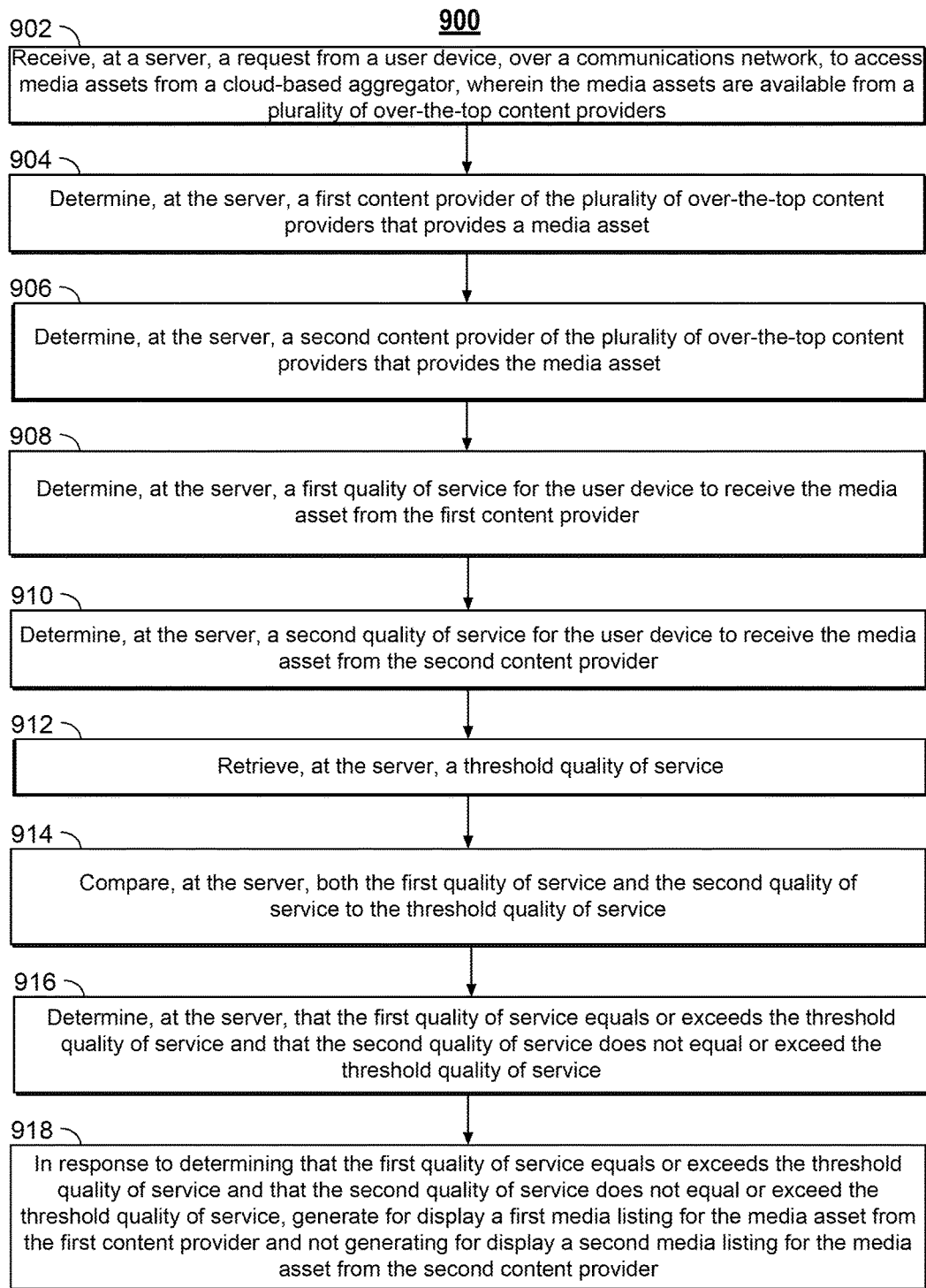
FIG. 9 is a flowchart of illustrative steps of recommending providers of media content to users viewing over-the-top content in accordance with some embodiments of the disclosure.

FIG. 9 is a flowchart of illustrative steps of recommending providers of media content to users viewing over-the-top content. It should be noted that process 900 or any step thereof could be performed on, or provided by, any of the devices shown in FIGS. 5-6. For example, process 900 may be executed by control circuitry 504 (FIG. 5) as instructed by a media guidance application implemented on user equipment 602, 604, and/or 606 (FIG. 6) in order to recommend providers of media content to users viewing over-the-top content. In addition, one or more steps of process 900 may be incorporated into or combined with one or more steps of any other process or embodiment (e.g., as described in relation to FIGS. 7-8 and 10-13).

In process 900, the media guidance application determines which media listings, if any, to present to a user based on the quality of service. For example, in order to preserve a high quality user experience, the media guidance application may only present media listings corresponding to a certain quality of service.

At step 902, the media guidance application receives (e.g., via I/O path 502 (FIG. 5)), at a server (e.g., super aggregator 624 (FIG. 6)), a request from a user device (e.g., user equipment 602 (FIG. 6)), over a communications network (e.g., communications network 614 (FIG. 6)), to access media assets from a cloud-based aggregator, wherein the media assets are available from a plurality of over-the-top content providers. For example, a user may wish to stream a movie to his or her mobile phone of personal computer.

At step 904, the media guidance application determines (e.g., via control circuitry 504 (FIG. 5)), at the server (e.g., super aggregator 624 (FIG. 6)), a first content provider (e.g., media content source 616 (FIG. 6)) of the plurality of over-the-top content providers that provides a media asset. For example, the media guidance application may retrieve a user profile associated with the user device and retrieve subscription data for the user profile, wherein the subscription data indicates a user subscribes to each of the plurality of over-the-top content providers. The media guidance application may then search each of the plurality of over-the-top content providers to determine whether each of the plurality of over-the-top content providers provides the media asset based on the subscription data.

At step 906, the media guidance application determines (e.g., via control circuitry 504 (FIG. 5)), at the server (e.g., super aggregator 624 (FIG. 6)), a second content provider (e.g., media content source 616 (FIG. 6)) of the plurality of over-the-top content providers that provides the media asset. For example, the media guidance application may retrieve a list of all media assets available from each of the subscription services associated with the user device.

At step 908, the media guidance application determines (e.g., via control circuitry 504 (FIG. 5)), at the server (e.g., super aggregator 624 (FIG. 6)), a first quality of service for the user device (e.g., user equipment 602 (FIG. 6)) to receive the media asset from the first content provider. For example, based on current network conditions, the media guidance application may determine an error rate at which the user device may access the media asset from the first content provider. For example, the media guidance application may query a user device for a checksum value and receive the checksum value from the user device in response to the query.

At step 910, the media guidance application determines (e.g., via control circuitry 504 (FIG. 5)), at the server (e.g., super aggregator 624 (FIG. 6)), a second quality of service for the user device (e.g., user equipment 602 (FIG. 6)) to receive the media asset from the second content provider. For example, based on current network conditions, the media guidance application may determine an error rate at which the user device may access the media asset from the second content provider as well.

At step 912, the media guidance application retrieves (e.g., from storage 508 (FIG. 5)), at the server (e.g., super aggregator 624 (FIG. 6)), a threshold quality of service. For example, the media guidance application may test for and determine whether or not certain criteria meet threshold criteria. If so, specific actions may be triggered.

At step 914, the media guidance application compares (e.g., via control circuitry 504 (FIG. 5)), at the server (e.g., super aggregator 624 (FIG. 6)), both the first quality of service and the second quality of service to the threshold quality of service. For example, for each content provider to which a subscription and/or access is available, the media guidance application may determine whether or not the quality of service exceeds a threshold quality of service.

At step 916, the media guidance application determines (e.g., via control circuitry 504 (FIG. 5)), at the server (e.g., super aggregator 624 (FIG. 6)), that the first quality of service equals or exceeds the threshold quality of service and that the second quality of service does not equal or exceed the threshold quality of service. For example, the media guidance application may determine that the error rate associated with receiving content from the first content provider is acceptable, whereas the error rate associated with receiving content from the second content provider is not acceptable.

At step 918, in response to determining that the first quality of service equals or exceeds the threshold quality of service and that the second quality of service does not equal or exceed the threshold quality of service, the media guidance application generates for display (e.g., via control circuitry 504 (FIG. 5)) a first media listing (e.g., movie 120 (FIG. 1)) for the media asset from the first content provider and not generating for display a second media listing for the media asset from the second content provider. Additionally, the media guidance application may generate for display a notification for accessing the media asset from the second content provider, wherein the notification indicates that the second quality of service is lower than the threshold quality of service. Accordingly, the media guidance application may only present media listings that preserve a high quality user experience.

In some embodiments, the media guidance application determines, at the server, a third content provider of the plurality of over-the-top content providers that provides the media asset. For example, the third content provider may include a publicly available streaming media provider that does not require a subscription. The media guidance application may determine a third quality of service for the user device to receive the media asset from the first content provider and compare the third quality of service to the threshold quality of service. The media guidance application may determine that the third quality of service equals or exceeds the threshold quality of service. In response to determining that the third quality of service equals or exceeds the threshold quality of service, the media guidance application may generate for display a third media listing for the media asset from the third content provider simultaneously with the first media listing.

In some embodiments, the first quality of service is based on one or more quality of service characteristics, and the quality of service characteristics include an error rate, bit rate, throughput lag, transmission delay, availability, or jitter experienced by the user device. Moreover, the media guidance application may determine the first quality of service comprises determining a first quality of service characteristic and a second quality of service characteristic (e.g., error rate and bit rate), assign a first weight to the first quality of service characteristic and a second weight to the second quality of service characteristic (e.g., based on user preferences), and determine a weighted average for the first quality of service characteristic and the second quality of service characteristic (e.g., a weighted average that represents the overall quality of service based on the characteristics).

In some embodiments, the media guidance application may determine qualitative or quantitative quality of service ratings for each content provider. For example, the media guidance application may input the first quality of service into a database listing ratings corresponding to different quality of services. The media guidance application may then compare the first quality of service to the different quality of services to determine a rating for the first quality of service, and generating for display the rating simultaneously with the media listing.

In some embodiments, the media guidance application may, in response to determining that the first quality of service does not equal or exceed the threshold quality of service, generate for display an option to receive an alert when the first quality of service equals or exceeds the threshold quality of service. For example, in order to preserve the high quality user experience, the media guidance application may alert the user as to when the media listing will correspond to a threshold quality of service. Additionally or alternatively, the media guidance application may, in response to determining that neither the first quality of service nor the second quality of service equals or exceeds the threshold quality of service, generates for display an option to automatically download the first media asset to the server, wherein the downloaded first media asset is available for on-demand playback on the user device. For example, if streaming a media asset is not preferable due to the quality of service, the media guidance application may download the media asset for later viewing by the user.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 9.

Figure 10:
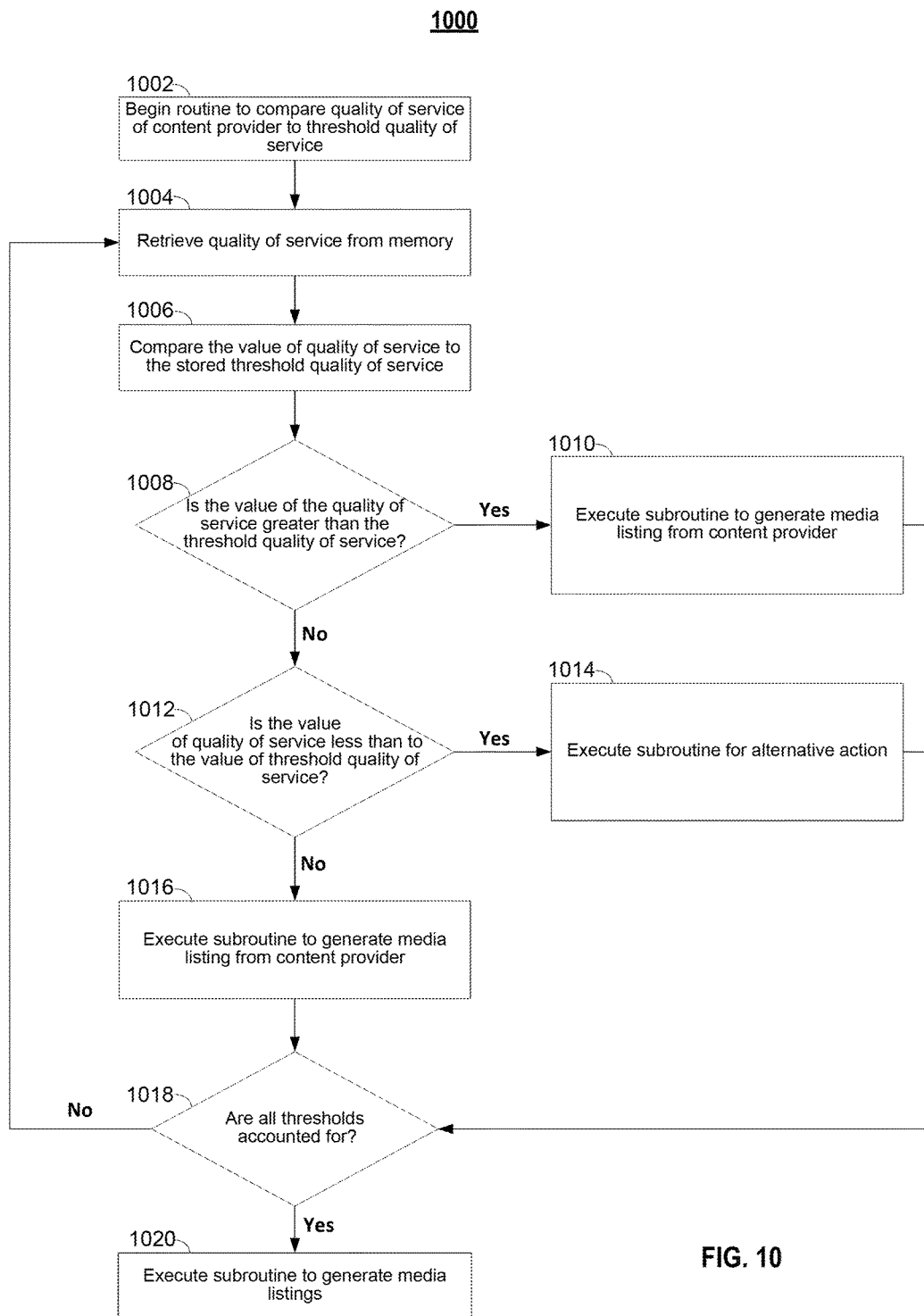
FIG. 10 is a flowchart of illustrative steps of comparing the quality of service to a threshold quality of service in accordance with some embodiments of the disclosure.

FIGS. 10 and 11 present processes for control circuitry (e.g., control circuitry 504) for comparing the quality of service to a threshold quality of service in accordance with some embodiments of the disclosure. In some embodiments this process may be encoded on to a non-transitory storage medium (e.g., storage device 508) as a set of instructions to be decoded and executed by processing circuitry (e.g., processing circuitry 506). Processing circuitry may in turn provide instructions to other sub-circuits contained within control circuitry 504, such as the tuning, video-generating, encoding, decoding, encrypting, decrypting, scaling, analog/digital conversion circuitry, and the like.

The flowchart in FIG. 10 describes a process implemented on control circuitry (e.g., control circuitry 504) for comparing the quality of service to a threshold quality of service in accordance with some embodiments of the disclosure.

At step 1002, control circuitry 504 compares the quality of service to a threshold quality of service. In some embodiments, this may be done either directly or indirectly in response to a user action or input (e.g., from signals received by control circuitry 504 or user input interface 510). For example, the process may begin directly in response to control circuitry 504 receiving signals from user input interface 510, or control circuitry 504 may prompt the user to confirm his or her input using a display (e.g., by generating a prompt to be displayed on display 512) prior to running the algorithm.

At step 1004, control circuitry 504 proceeds to retrieve a quality of service from memory. In some embodiments, control circuitry 504 may receive a single primitive data structure that represents the value of quality of service. In some embodiments, the value may be stored as part of a larger data structure, and control circuitry 504 may retrieve the value by executing appropriate accessor methods to retrieve the value from the larger data structure.

At step 1006, control circuitry 504 proceeds to compare the value of quality of service to the stored value of a threshold quality of service. In some embodiments, the value of the threshold quality of service may be stored (e.g., on storage device 508) prior to beginning the process. In some embodiments, the value of the threshold quality of service may also be retrieved for each and every instance of the quality of service, and the value of the threshold quality of service may change from iteration to iteration. In some embodiments, control circuitry 504 may directly compare the value of the threshold quality of service with the value of the quality of service by accessing the values respectively from memory and performing a value comparison. In some instances, control circuitry 504 may call a comparison function (e.g., for object-to-object comparison) to compare the quality of service and the threshold quality of service.

At step 1008, control circuitry 504 compares the values of the quality of service and the threshold quality of service to determine if the value of the quality of service is greater than the value of the threshold quality of service. If the condition is satisfied, the algorithm may proceed to step 1010; if the condition is not satisfied, the algorithm may proceed to step 1012 instead.

At step 1010, control circuitry 504 executes a subroutine to generate a media listing from content provider, add a media listing to a ranked list, etc., based on the condition at step 1008 being satisfied. After the subroutine is executed, process 1000 proceeds to step 1018 where it is determined if all threshold quality of services are accounted for. For example, the media guidance application may apply various thresholds. For example, the media guidance application may apply a threshold based on the type of content, the time of transmission, or any other criteria. Furthermore, in some embodiments, the media guidance may apply thresholds to individual characteristics of a quality of service. Accordingly, at step 1018, the media guidance application determines whether or not all the thresholds are accounted for and if further iterations are needed.

At step 1012, control circuitry 504 compares the values of the quality of service and the threshold quality of service to determine if the value of the quality of service is less than the value of the quality of service. If the condition is satisfied, the process may proceed to step 1014; if the condition is not satisfied, the process may proceed to step 1016 instead.

At step 1014, control circuitry 504 executes a subroutine for an alternative action based on the condition of step 1012 being satisfied. For example, the media guidance application may remove a media listing from a display screen, may remove the media listing from a ranked list, may notify the user of the insufficient quality of service, etc. After the subroutine is executed, process 1000 proceeds to step 1018.

At step 1016, control circuitry 504 executes a subroutine to generate a media listing from the content provider based on both of the conditions in 1008 and 1012 not being satisfied (e.g., the quality of service is equal to the threshold quality of service). After the subroutine is executed, process 1000 proceeds to 1018.

At step 1018, control circuitry 504 checks if all thresholds are accounted for. If all of the instances have been evaluated, control circuitry 504 may proceed to step 1020. For example, control circuitry 504 may call a function to see if there is an additional threshold. If the function returns true (i.e., there are still instances that need to be processed), control circuitry 504 proceeds to step 1004. At step 1020, control circuitry 504 executes a subroutine to generate media listings (e.g., as described in relation to FIGS. 1-3).

It is contemplated that the descriptions of FIG. 10 may be used with any other embodiment of this disclosure (e.g., as described in FIGS. 7-9). In addition, the descriptions described in relation to the algorithm of FIG. 10 may be done in alternative orders or in parallel to further the purposes of this disclosure. For example, conditional statements and logical evaluations, such as those at 1008 and 1012, may be performed in any order or in parallel or simultaneously to reduce lag or increase the speed of the system or method. As a further example, in some embodiments, several thresholds may be evaluated in parallel, using multiple logical processor threads, or the algorithm may be enhanced by incorporating branch prediction. Furthermore, it should be noted that the process of FIG. 10 may be implemented on a combination of appropriately configured software and hardware, and that any of the devices or equipment discussed in relation to FIGS. 4-5 could be used to implement one or more portions of the process.

The pseudocode in FIG. 11 describes a process to compare the quality of service of a content provider to threshold in accordance with some embodiments of the disclosure. It will be evident to one skilled in the art that the process described by the pseudocode in FIG. 10 may be implemented in any number of programming languages and a variety of different hardware, and that the style and format should not be construed as limiting, but rather a general template of the steps and procedures that would be consistent with code used to implement some embodiments of this disclosure.

At line 1101, control circuitry 504 runs a subroutine to initialize variables and prepare to compare the quality of service of a content provider to a threshold, which begins on line 1103. For example, in some embodiments control circuitry 504 may copy instructions from a non-transitory storage medium (e.g., storage device 508) into RAM or into the cache for processing circuitry 506 during the initialization stage. Additionally, in some embodiments the value of the threshold quality of service being used for comparison, or a tolerance level for determining if two values are essentially equivalent, may be retrieved, set, and stored at 1101.

At line 1105, control circuitry 504 receives the instances of the quality of service. In some embodiments, these instances may be retrieved from stored memory. Control circuitry 504 may receive instances of the quality of service by receiving, for example, a pointer to an array of values of the quality of service. In another example, control circuitry 504 may receive an object of a class, such as an iterator object containing elements of the quality of service.

At line 1106, control circuitry 504 iterates through the various instances of the quality of service, if only a single instance is available, the loop will only execute once. This loop may be implemented in multiple fashions depending on the choice of hardware and software language used to implement the algorithm of FIG. 11; for example, this may be implemented as part of a "for" or "while" loop.

At line 1107, control circuitry 504 stores the value of the quality of service into a temporary variable "A." In some embodiments, the value of the quality of service will be stored as part of a larger data structure or class, and the value of the quality of service may be obtained through appropriate accessor methods. In some embodiments, the quality of service may be converted from a string or other non-numeric data type into a numeric data type by means of an appropriate hashing algorithm. In some embodiments, control circuitry 504 may call a function to perform a comparison of the quality of service to the threshold quality of service. In some embodiments, the quality of service may be encoded as a primitive data structure, and rather than using a temporary variable, the quality of service may be directly used in the comparisons at lines 1109 and 1111.

At line 1108, control circuitry 504 stores the value of the threshold quality of service into a temporary variable "B." Similar to the quality of service, in some embodiments, the value of the threshold quality of service will be stored as part of a larger data structure or class, and the value of the threshold quality of service may be obtained through accessor methods. In some embodiments, the threshold quality of service may be converted from a string or other non-numeric data type into a numeric data type by means of an appropriate hashing algorithm, or the threshold quality of service may be a primitive data structure, and may be directly used in the comparisons at lines 1109 and 1111.

At line 1109, control circuitry 504 compares the value of A to the value of B to see if they are essentially equivalent. This is achieved by subtracting the value of B from A, taking the absolute value of the difference, and then comparing the absolute value of the difference to a predetermined tolerance level. In some embodiments, the tolerance level may be a set percentage of either A or B. In some embodiments, the tolerance level may be a fixed number. For example, setting the tolerance level to a set multiple of machine epsilon may allow for the algorithm to account for small rounding errors that may result from the use of floating point arithmetic. In some embodiments, the tolerance level may be set to zero, or the condition inside the IF statement may be replaced with a strict equivalence between A and B.

At line 1110, control circuitry 504 executes a subroutine to generate media listing from content provider using control circuitry if the condition in line 1109 is satisfied. In some embodiments, this may be achieved by processing circuitry 506 sending the appropriate signals to control circuitry 504.

At line 1111, control circuitry 504 compares the value of A and B to determine if A is less than B. In some embodiments, this comparison will only be done if A is not essentially equivalent to B and the comparison in line 1109 evaluates to FALSE.

At line 1112, control circuitry 504 executes a subroutine for an alternative action using control circuitry if the condition in line 1111 is satisfied.

At line 1113, control circuitry 504 determines whether neither condition in line 1109 or 1111 are satisfied. If neither condition is satisfied, then the instruction at line 1114 may be evaluated and executed.

At line 1114, control circuitry 504 executes a subroutine to generate media listing from content provider using control circuitry using control circuitry 504 if neither of the conditions at lines 609 or 611 are satisfied.

At line 1116, control circuitry 504 runs a termination subroutine after the algorithm has performed its function. For example, in some embodiments control circuitry 504 may destruct variables, perform garbage collection, free memory or clear the cache of processing circuitry 506.

It will be evident to one skilled in the art that process 1100 described by the pseudocode in FIG. 11 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments, break conditions may be placed after lines 1110 and 1112 to speed operation, or the conditional statements may be replaced with a case-switch.

Figure 12:
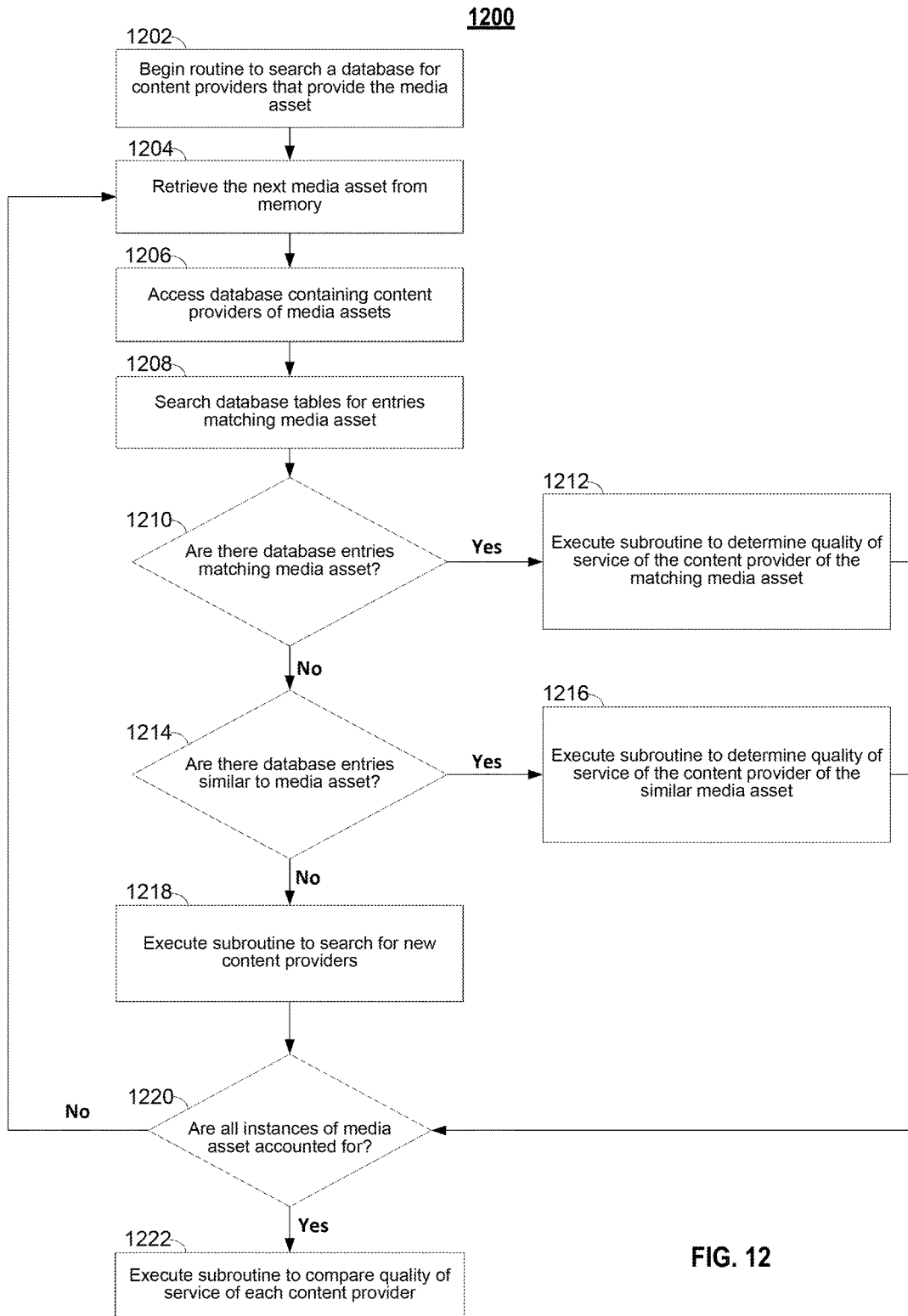
FIG. 12 is a flow-chart of illustrative steps for determining quality of service for a plurality of content providers from which a media asset is available in accordance with some embodiments of the disclosure.

FIGS. 12 and 13 present processes implemented on control circuitry (e.g., control circuitry 504) to search a database for content providers that provide the media asset in accordance with some embodiments of the disclosure. Similar to the algorithms described by FIGS. 10 and 11, in some embodiments this process may be encoded on to a non-transitory storage medium (e.g., storage device 508) as a set of instructions to be decoded and executed by processing circuitry (e.g., processing circuitry 506). Processing circuitry may in turn provide instructions to other sub-circuits contained within control circuitry 504, such as the tuning, video generating, encoding, decoding, encrypting, decrypting, scaling, analog/digital conversion circuitry, and the like.

The flowchart in FIG. 12 describes a process implemented on control circuitry (e.g., control circuitry 504) to search a database for content providers that provide the media asset in accordance with some embodiments of the disclosure.

At step 1202, control circuitry 504 searches a database for content providers that provide the media asset. In some embodiments, this may be done either directly or indirectly in response to a user action or input (e.g., from signals received by control circuitry 504 or user input interface 510.)

At step 1204, control circuitry 504 proceeds to retrieve the next instance of the media asset from stored memory. In some embodiments, control circuitry 504 may retrieve a single primitive data structure that represents the value of the media asset. In some embodiments, control circuitry 504 may retrieve the value from a larger class or data structure.

At step 1206, control circuitry 504 accesses a database containing content providers of media assets. In some embodiments, this database may be stored locally (e.g., on storage device 508) prior to beginning the algorithm. In some embodiments, the database may also be accessed by using communications circuitry to transmit information across a communications network (e.g., communications network 614) to a database implemented on a remote storage device (e.g., media guidance data source 618).

At step 1208, control circuitry 504 searches database tables for entries matching the media asset. In some embodiments, this may be done by comparing an identifier, for example, a string or integer representing the media asset, that matches the types of identifiers used inside the database. In some embodiments, control circuitry 504 may submit a general query to the database for table entries matching the media asset, and control circuitry 504 may receive a list of indices or a data structure containing a portion of the database contents. In some embodiments, the database may implement a junction table that in turn cross-references entries from other databases. In this case, control circuitry 504 may retrieve indices from a first database that in turn can be used to retrieve information from a second database. Although we may describe control circuitry 504 interacting with a single database for purposes of clarity, it is understood that the algorithm of FIG. 12 may be implemented using multiple independent or cross-referenced databases.

At step 1210, control circuitry 504 determines if there are database entries matching the media asset. In some embodiments, control circuitry 504 may receive a signal from the database indicating that there are no matching entries. In some embodiments, control circuitry 504 may instead receive a list of indices or data structures with a NULL or dummy value. If control circuitry 504 identifies that there are database entries matching the media asset, process 1200 proceeds to step 1212; otherwise, process 1200 proceeds to step 1214.

At step 1212, control circuitry 504 executes a subroutine to determine a quality of service of the content provider of the matching media asset. Afterwards, process 1200 proceeds to step 1220 where it is determined if there are further instances of the media asset that need to be accounted for.

At step 1214, control circuitry 504 determines if there are database entries similar to the media asset. For example, in some embodiments, if the media asset is encoded as a string with multiple characters, control circuitry 504 may perform additional database queries for similar strings with individual characters replaced, removed or added. In some embodiments, control circuitry 504 may also determine (e.g., via fuzzy logic) if the original query was a commonly misspelled word, and will submit a query with the correct spelling instead. In another example, the media asset may be encoded as an integer; control circuitry 504 may perform additional queries for other integers within a certain range. In some embodiments, control circuitry 504 may retrieve database entries similar to the media asset without requiring further queries. If control circuitry 504 identifies that there are database entries similar to the media asset, process 1200 proceeds to step 1216; otherwise, process 1200 proceeds to step 1218.

At step 1216, control circuitry 504 executes a subroutine to determine a quality of service of the content provider of the similar media asset. Afterwards, the algorithm may proceed to step 1220.

At step 1218, control circuitry 504 executes a subroutine to search for new content providers after determining that there were no matching database entries for the media asset. Afterwards, process 1200 proceeds to step 1220.

At step 1220, control circuitry 504 determines if all instances of the media asset are accounted for and if further iterations are needed. If further iterations are needed, process 1200 will loop back to step 1204 where control circuitry 504 will retrieve the next instance of the media asset. If no further iterations are needed, the algorithm will proceed to step 1222.

At step 1222, control circuitry 504 executes a subroutine to compare quality of service of each content provider.

It is contemplated that the descriptions of FIG. 12 may be used with any other embodiment of this disclosure (e.g., as described in FIGS. 7-9). In addition, the descriptions described in relation to process 1200 of FIG. 12 may be done in alternative orders or in parallel to further the purposes of this disclosure. For example, control circuitry 504 may submit multiple queries to the database in parallel, or it may submit multiple queries to a plurality of similar databases in order to reduce lag and speed the execution of process 1200. As a further example, although step 1212 and step 1216 are described as being mutually exclusive, both exact entries and similar entries may be processed for a single instance of the media asset. To further this purpose, in some embodiments, step 1210 and step 1214 may be performed in parallel by control circuitry 504. Furthermore, it should be noted that the process of FIG. 12 may be implemented on a combination of appropriately configured software and hardware, and that any of the devices or equipment discussed in relation to FIGS. 4-5 could be used to implement one or more portions of process 1200.

The pseudocode in FIG. 13 describes a process to search a database for content providers that provide the media asset in accordance with some embodiments of the disclosure. It will be evident to one skilled in the art that process 1300 described by the pseudocode in FIG. 13 may be implemented in any number of programming languages and a variety of different hardware, and that the style and format should not be construed as limiting, but rather a general template of the steps and procedures that would be consistent with code used to implement some embodiments of this disclosure.

At line 1301, control circuitry 504 runs a subroutine to initialize variables and prepare to search a database for content providers that provide the media asset, which begins on line 1305. For example, in some embodiments, control circuitry 504 may copy instructions from a non-transitory storage medium (e.g., storage device 508) into RAM or into the cache for processing circuitry 506 during the initialization stage.

At line 1305, control circuitry 504 receives instances of the media asset. In some embodiments, these instances may be retrieved from memory.

At line 1306, control circuitry 504 iterates through the various instances of the media asset; if only a single instance is available, the loop will only execute once. This loop may be implemented in multiple fashions depending on the choice of hardware and software language used to implement the algorithm of FIG. 13; for example, this may be implemented as part of a "for" or "while" loop, in some programming languages. In some embodiments, it may be convenient to store the instances of the media asset in a single class or encapsulated data structure that will perform the loop as part of an internal method.

At line 1307, control circuitry 504 queries a database for entries matching the media asset. Depending on how the database is implemented and how the media asset is stored, an intermittent step may be required to convert the media asset into a form consistent with the database. For example, the media asset may encoded into a string or an integer using an appropriate hashing algorithm prior to being transmitted to the database by control circuitry 504 as part of a query. In some embodiments, the media asset may be encoded as a primitive data structure, and control circuitry 504 may submit the media asset as a query to the database directly. After querying the database, control circuitry 504 may receive a set of database entries matching the media asset. In some embodiments, control circuitry 504 may receive these entries in the form of a data structure, a set of indices of the database, or a set of indices of another cross-referenced database.

At line 1308, control circuitry 504 will determine if there are any database entries matching the media asset. In some embodiments, control circuitry 504 may determine this by checking if the database returned an empty data structure or a NULL value in response to the query in line 1307. If there are matching database entries, process 1300 proceeds to line 1309. If there were no matching database entries, the algorithm may instead proceed to line 1312.

At line 1309, control circuitry 504 retrieves one or more values of content providers from the database entries matching the media asset. For example, if control circuitry 504 retrieves a list of indices after querying the database in line 1307, in some embodiments control circuitry 504 may retrieve the database entries for content providers located at the received indices. In some embodiments, the indices may point to a larger data structure contained within the database, and control circuitry 504 may retrieve the values of the content providers from within the data structure using appropriate accessor methods. In some embodiments, control circuitry 504 may retrieve the values of the content providers and store them in a separate data structure locally (e.g., in storage 508) prior to proceeding further. After retrieving the values of the content providers, the algorithm will proceed to line 1310.

At line 1310, control circuitry 504 executes a subroutine to use the values of the content providers to determine quality of service for each content provider using control circuitry. Afterwards, process 1300 proceeds to line 1315.

At line 1311, control circuitry 504 determines if there are any database entries similar to the media asset. For example, the media asset may be represented by an object of a class. Control circuitry 504 may call a function to perform a fuzzy comparison (e.g., a comparison to identify similar objects of the class) by comparing specific fields of the class or by performing approximate string matching on data related to the media asset. If database entries similar to the media asset are found by control circuitry 504 then process 1300 proceeds to line 1312. If control circuitry 504 does not find matching entries (e.g., a query to the database returns a NULL value), process 1300 proceeds to line 1312.

At line 1312, control circuitry 504 executes a subroutine to determine a quality of service for each content provider using control circuitry. Afterwards, process 1300 proceeds to line 1315.

At line 1311, control circuitry 504 determines that there were no database entries matching the media asset. In this case, process 1300 will proceed to line 1312.

At line 1312, control circuitry 504 executes a subroutine to determine a quality of service using control circuitry 504. Afterwards, the algorithm may proceed to line 1314.

At line 1314, control circuitry 504 executes a subroutine to determine quality of service using control circuitry 504, if neither of the conditions at lines 1309 or 1311 are satisfied.

At line 1315, control circuitry 504 executes a subroutine to compare the quality of services of the content providers using control circuitry. Afterwards, process 1300 proceeds to the termination subroutine at line 1317.

At line 1317, control circuitry 504 executes a termination subroutine after process 1300 has performed its function and all instances of the media asset have been processed and checked against the database. For example, in some embodiments control circuitry 504 may destruct variables, perform garbage collection, free memory or clear the cache of processing circuitry 506.

It will be evident to one skilled in the art that process 1300 described by the pseudocode in FIG. 13 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments the code may be rewritten so control circuitry 504 is instructed to evaluate multiple instances of the media asset and submit multiple database queries simultaneously using a plurality of processors or processor threads. It is also understood that, although we may describe control circuitry 504 interacting with a single database, this is only a single embodiment described for illustrative purposes, and process 1300 may be implemented using multiple independent or cross-referenced databases. For example, a database stored locally (e.g., on storage 508) may index or cross-reference a database stored remotely (e.g., media guidance data source 618), which may be accessible through any number of communication channels (e.g., communications network 614). In some embodiments, this may allow control circuitry 504 to utilize a look-up table or database front-end efficiently stored on a small local drive to access a larger database stored on a remote server on demand.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method of selecting providers of media content, the method comprising:
receiving, at a server, a request from a user device, over a communications network, to access media assets from a cloud-based aggregator, wherein the media assets are available from a plurality of over-the-top content providers;

retrieving, at the server, subscription data for a user of the user device, wherein the subscription data indicates that the user subscribes to each of the plurality of over-the-top content providers;

searching, by the server, based on the subscription data, a first content provider of the plurality of over-the-top content providers to determine that the first content provider provides a media asset;

searching, by the server, based on the subscription data, a second content provider of the plurality of over-the-top content providers to determine that the second content provider provides the media asset;

determining, at the server, a first quality of service of a first communication path for the user device to receive the media asset from the first content provider;

determining, at the server, a second quality of service of a second communication path for the user device to receive the media asset from the second content provider;

comparing, at the server, the first quality of service to the second quality of service, wherein each of the first quality of service and the second quality of service are based on a respective quality of service characteristic determined by the user device, and wherein the respective quality of service characteristics comprise error rate, throughput lag, transmission delay, or jitter;

determining, at the server, that the first quality of service is greater than the second quality of service based on the comparison;

in response to determining that the first quality of service is greater than the second quality of service, selecting for inclusion in a list of media asset listings a media asset listing for the media asset from the first content provider and excluding from the list of media asset listings a media asset listing for the media asset from the second content provider; and generating for display the list of the media asset listings.

2. The method of claim 1, wherein determining the first quality of service comprises:
determining a first quality of service characteristic and a second quality of service characteristic;
assigning a first weight to the first quality of service characteristic and a second weight to the second quality of service characteristic; and
determining a weighted average for the first quality of service characteristic and the second quality of service characteristic.

3. The method of claim 1, wherein determining the first quality of service comprises:
querying the user device for a checksum value; and
receiving the checksum value from the user device in response to the query.

4. The method of claim 1, further comprising:
inputting the first quality of service into a database listing ratings corresponding to different quality of services;
comparing the first quality of service to the different quality of services to determine a rating for the first quality of service; and
generating for display the rating simultaneously with the media asset listing.

5. The method of claim 1, further comprising generating a notification for accessing the media asset from the second content provider, wherein the notification indicates that the second quality of service is lower than the first quality of service.

6. The method of claim 1, further comprising:
in response to determining that the first quality of service is equal to the second quality of service based on the comparison, generating for display the media asset listing for the media asset from the first content provider and a different media asset listing for the media asset from the second content provider.

7. The method of claim 1, further comprising:
retrieving a threshold quality of service;
comparing the first quality of service to the threshold quality of service; and
in response to determining that the first quality of service does not equal or exceed the threshold quality of service, generating for display an option to receive an alert when the first quality of service equals or exceeds the threshold quality of service.

8. The method of claim 1, further comprising:
retrieving a threshold quality of service;
comparing the first quality of service to the threshold quality of service; and
in response to determining that the first quality of service does not equal or exceed the threshold quality of service, generating for display an option to automatically download the first media asset to the server when the first quality of service equals or exceeds the threshold quality of service, wherein the downloaded first media asset is available for on-demand playback on the user device.

9. A system for selecting providers of media content, the system comprising a server in communication with a user device, wherein the server includes control circuitry configured to:
receive a request from the user device, over a communications network, to access media assets from a cloud-based aggregator, wherein the media assets are available from a plurality of over-the-top content providers;
retrieve subscription data for a user of the user device, wherein the subscription data indicates that the user subscribes to each of the plurality of over-the-top content providers;
search, based on the subscription data, a first content provider of the plurality of over-the-top content providers to determine that the first content provider provides a media asset;
search, based on the subscription data, a second content provider of the plurality of over-the-top content providers to determine that the second content provider provides the media asset;
determine a first quality of service of a first communication path for the user device to receive the media asset from the first content provider;
determine a second quality of service of a second communication path for the user device to receive the media asset from the second content provider;
compare the first quality of service to the second quality of service wherein each of the first quality of service and the second quality of service are based on a respective quality of service characteristic determined by the user device, and wherein the respective quality of service characteristics comprise error rate, throughput lag, transmission delay, or jitter;
determine that the first quality of service is greater than the second quality of service based on the comparison;

in response to determining that the first quality of service is greater than the second quality of service, select for inclusion in a list of media asset listings a media asset listing for the media asset from the first content provider and excluding from the list of media asset listings a media asset listing for the media asset from the second content provider; and generate for display the list of the media asset listings.

10. The system of claim 9, wherein the control circuitry configured to determine the first quality of service is further configured to:

determine a first quality of service characteristic and a second quality of service characteristic;

assign a first weight to the first quality of service characteristic and a second weight to the second quality of service characteristic; and determine a weighted average for the first quality of service characteristic and the second quality of service characteristic.

11. The system of claim 9, wherein the control circuitry configured to determine the first quality of service further is further configured to:

query the user device for a checksum value; and receive the checksum value from the user device in response to the query.

12. The system of claim 9, wherein the control circuitry is further configured to:

input the first quality of service into a database listing ratings corresponding to different quality of services;

compare the first quality of service to the different quality of services to determine a rating for the first quality of service; and generate for display the rating simultaneously with the media asset listing.

13. The system of claim 9, wherein the control circuitry is further configured to generate a notification for accessing the media asset from the second content provider, wherein the notification indicates that the second quality of service is lower than the first quality of service.

14. The system of claim 9, wherein the control circuitry is further configured to, in response to determining that the first quality of service is equal to the second quality of service based on the comparison, generate for display the media asset listing for the media asset from the first content provider and a different media asset listing for the media asset from the second content provider.

15. The system of claim 9, wherein the control circuitry is further configured to:

retrieve a threshold quality of service;

compare the first quality of service to the threshold quality of service; and in response to determining that the first quality of service does not equal or exceed the threshold quality of service, generate for display an option to receive an alert when the first quality of service equals or exceeds the threshold quality of service.

16. The system of claim 9, wherein the control circuitry is further configured to:

retrieve a threshold quality of service;

compare the first quality of service to the threshold quality of service; and in response to determining that the first quality of service does not equal or exceed the threshold quality of service, generate for display an option to automatically download the first media asset to the server when the first quality of service equals or exceeds the threshold quality of service, wherein the downloaded first media asset is available for on-demand playback on the user device.

* * * * *